United States Patent
Nair et al.

(10) Patent No.: US 11,768,812 B2
(45) Date of Patent: *Sep. 26, 2023

(54) DECLARATIVE ENTITY SEGMENTATION

(71) Applicant: Salesforce, Inc., San Francisco, CA (US)

(72) Inventors: Vineeth Anand Nair, Mountain House, CA (US); Lakshmi Srinivas Parimi, San Jose, CA (US); Ashok Shivarudraiah, Fremont, CA (US); Alan Mathias Hoffman, Orem, UT (US); Nigel Wallace Menger, Halifax (CA); Neil Raymond Parsons, Bedford (CA); Kasia Fichtner, Moraga, CA (US); Pamela Sue Walquist, Carmel, IN (US); Sarah Flamion, Newburgh, IN (US); Matthew Westover, San Francisco, CA (US); Jamin Hall, Suwanee, GA (US)

(73) Assignee: Salesforce Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,686

(22) Filed: Jun. 7, 2022

(65) Prior Publication Data

US 2022/0300468 A1  Sep. 22, 2022

Related U.S. Application Data

(63) Continuation of application No. 17/158,882, filed on Jan. 26, 2021, now Pat. No. 11,366,578.

(Continued)

(51) Int. Cl.
*G06F 3/04842* (2022.01)
*G06F 16/21* (2019.01)
(Continued)

(52) U.S. Cl.
CPC ........ *G06F 16/211* (2019.01); *G06F 3/04842* (2013.01); *G06F 9/451* (2018.02);
(Continued)

(58) Field of Classification Search
CPC .. G06F 16/285; G06F 16/2455; G06F 16/248; G06F 9/451; G06F 3/04842
See application file for complete search history.

(56) References Cited

U.S. PATENT DOCUMENTS

2014/0119322 A1* 5/2014 Wang .................... H04W 52/16
                                                                370/329
2016/0335673 A1* 11/2016 Walker ............... G06Q 30/0269
(Continued)

OTHER PUBLICATIONS

Zhe Fu et al., Spectral Clustering Based Regular Expression Grouping, Oct. 1, 2014, IEEE Xplore, pp. 243-244 (Year: 2014).*

(Continued)

*Primary Examiner* — Tam T Tran
(74) *Attorney, Agent, or Firm* — Holland & Hart LLP

(57) ABSTRACT

A method for data processing includes displaying, at a user interface, a plurality of attributes that are defined by a data model configured for a tenant of a multi-tenant system. The plurality of attributes includes a one-to-many attribute that is configured to support multiple inputs and a direct attribute configured to support a single input. The method may further include receiving a selection of a first one-to-many attribute for defining an expression for identifying a segment of entities. The method may further include activating, for selection at the user interface, a subset of the attributes based on each attribute of the subset being dependent on the first attribute. The method may further include receiving an indication of the expression, executing a database query to identify the segment of entities, and transmitting, to a content communication system, an indication of the segment of entities.

20 Claims, 12 Drawing Sheets

Related U.S. Application Data

(60) Provisional application No. 63/094,267, filed on Oct. 20, 2020.

(51) Int. Cl.
*G06F 9/451* (2018.01)
*G06F 16/2455* (2019.01)
*G06F 16/28* (2019.01)
*G06F 16/248* (2019.01)

(52) U.S. Cl.
CPC ........ *G06F 16/248* (2019.01); *G06F 16/2455* (2019.01); *G06F 16/285* (2019.01)

(56) References Cited

U.S. PATENT DOCUMENTS

| | | | | |
|---|---|---|---|---|
| 2018/0349933 A1* | 12/2018 | Modarresi | .......... | G06Q 30/0204 |
| 2021/0158398 A1* | 5/2021 | Merrill | ............... | G06Q 30/0277 |

OTHER PUBLICATIONS

Claudia Marinica et al., Post-Processing of Discovered Association Rules Using Ontologies, Dec. 1, 2008, IEEE Computer Society, pp. 126-133 (Year: 2008).*

* cited by examiner

DECLARATIVE ENTITY SEGMENTATION

CROSS REFERENCE

The present application for patent is a continuation of U.S. patent application Ser. No. 17/158,882 by Nair et al., entitled "DECLARATIVE ENTITY SEGMENTATION AND SEGMENT ATTRIBUTE EXTENSION," filed Jan. 26, 2021, which claims the benefit of U.S. Provisional Patent Application No. 63/094,267 by Nair et al., entitled "DECLARATIVE ENTITY SEGMENTATION AND SEGMENT ATTRIBUTE EXTENSION," filed Oct. 20, 2020; each of which is assigned to the assignee hereof, and each of which is expressly incorporated by reference herein.

FIELD OF TECHNOLOGY

The present disclosure relates generally to database systems and data processing, and more specifically to declarative entity segmentation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may support content distribution to users. In some cases, the cloud platform may support a service that supports segmenting users into groups based on profiles and other attributes. These segments may be used for marketing purposes, such as content distribution, to a particular set of a target users having some attribute similarities.

DETAILED DESCRIPTION

Figure 1:
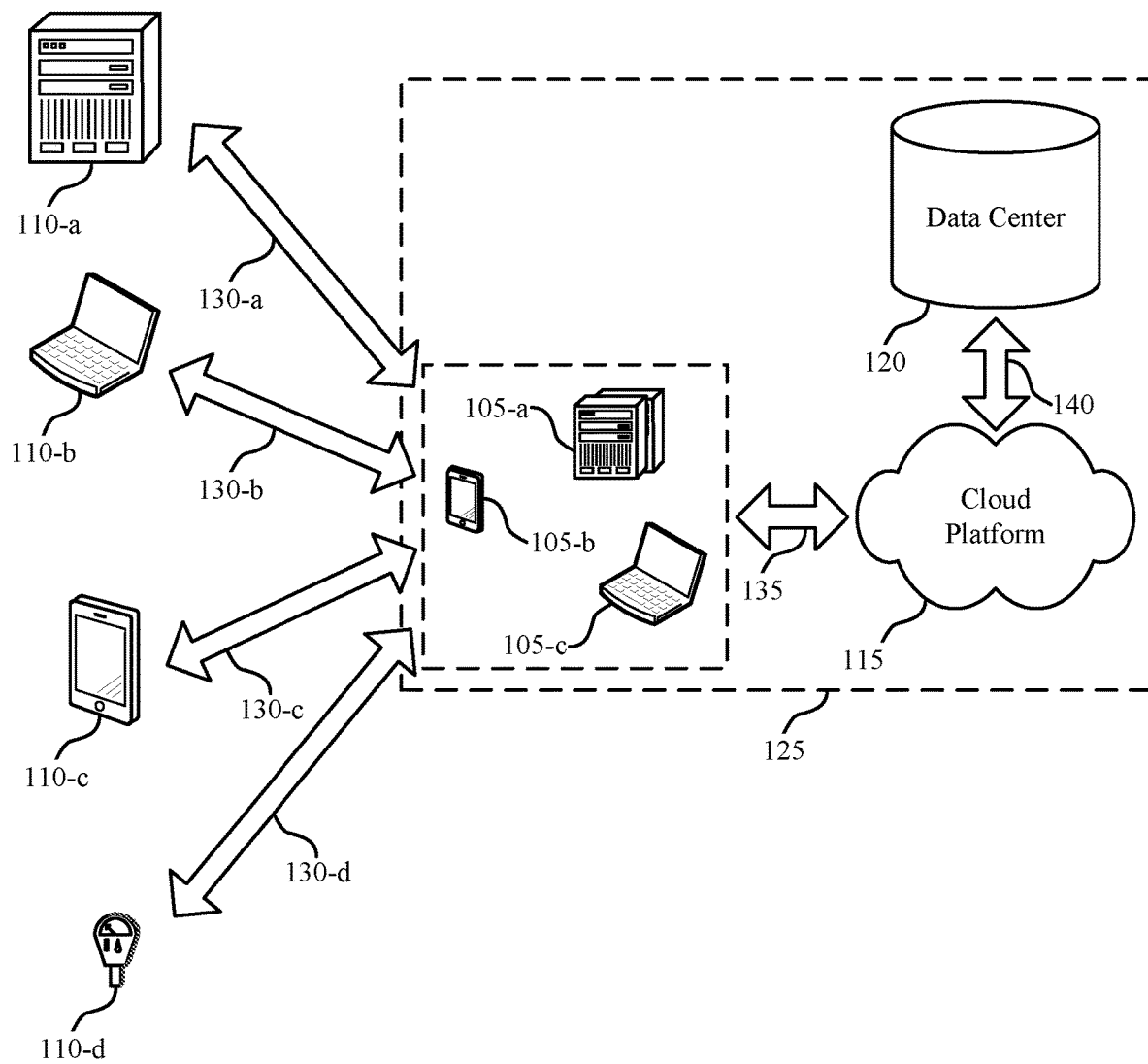
FIG. 1 illustrates an example of a data processing system that supports declarative entity segmentation in accordance with aspects of the present disclosure.

A cloud platform may support a customer data platform. A customer data platform may include one or more applications and may support functionality to ingest data from multiple sources, parse and analyze the data to define and build segments of users or entities based on attributes and profile data. These attributes may be inferred or may be explicit attributes, such as age, gender, interests, spending habits, browsing history, etc. The customer data platform may utilize these attributes to categorize or identify segments of related entities. In some examples, these segments of associated entities may be used for content distribution, such as for distribution of marketing content of a marketing campaign.

In some examples, the customer data platform may support a plurality of different tenants or organizations. Each tenant may be configured with a separate data model for attributes and entities. The techniques described herein support segment identification based on a declarative expression. For example, the customer data platform may support a user interface that allows a user to build rules for selection of attributes, aggregate attributes, filter entity identifiers based on attributes, etc. For example, a user may build an expression rule using the interface by selecting one or more attributes, logical operators associated with the attributes (e.g., contains, greater than, etc.), and a Boolean operator that is associated with two or more attributes. Various rules may be nested and aggregated using the user interface. The techniques described herein support users building a valid complex expression that includes multiple attributes and operators, and the complex expression may be used to identify a segment of entity identifiers based on attributes associated with a plurality of entity identifiers supported by the tenant.

The selectable attributes may depend on the data model for the particular tenant. A data model may support direct attributes and one-to-many attributes. Direct attributes may correspond to attributes which may have one input per user or entity. Example direct attributes include name, birthday, gender, eye color, home state, etc. One-to-many attributes, which may also be referred to as "related" attributes, may include multiple inputs per attribute. For example, multiple sales order attribute entries or records may be associated with a single entity. Further, each attribute may include sub-attributes. For example, each sales order attribute may include information about the sales order, such as product name, color, SKU, etc.

The data model and the types of attributes may inform the expression that the user is able to build using the user interface supported by the customer data platform. For example, if a user selects a one-to-many attribute, then a container may be activated within the user interface. Those attributes that depend from the selected one-to-many attribute may be selected and combined (e.g., using Boolean operators) within the container. Similarly, given a selection of a one-to-many attribute, an operator (e.g., an aggregation operator) may be selectable, such that each instance of the attribute (or a set of the instances of the attributes) associated with an entity may be considered identifying whether an entity and the attributes satisfy the expression. After generation of the expression using the declarative expression techniques described herein, the system may generate a database query based on the expression. The database query may identify entity identifiers in the data model that satisfy the expression. As such, the expression functions as a filter to identify entities for the segment. These techniques may support greater flexibility for segment identification, as well as reduced processing and memory overhead.

Aspects of the disclosure are initially described in the context of an environment supporting an on-demand database service. Aspects of the disclosure are further described with respect to a system for entity segmentation and implementation, a system for declarative entity segmentation and a portion of a data model supporting declarative segmentation, attribute representations that support declarative entity segmentation, and a process flow diagram illustrating declarative entity segmentation and implementation. Aspects of the disclosure are further illustrated by and described with reference to apparatus diagrams, system diagrams, and flowcharts that relate to declarative entity segmentation.

FIG. 1 illustrates an example of a system 100 for cloud computing that supports declarative entity segmentation in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support a segmentation application accessible at one or more of the cloud clients 105. The segmentation application may be utilized to identify segments of entity identifiers based on attributes associated with entities identifiers. A user of a cloud client 105 may utilize the application to identify a segment of entities to receive a content item (e.g., marketing content).

Some systems may identify segments of user identifiers based on attributes associated with the user identifiers. However, these systems may allow users to be identified using a 1:1 user to attribute mapping. To identify users that are associated with multiple attributes, systems may normalize database tables, such that the data is combined or aggregated in order to query for users that are associated with multiple attributes. However, database normalization may be resource intensive, and as such, when a person is seeking to identify users associated with multiple combinations of attributes, the resource overhead may increase significantly, because multiple tables may be combined in order to normalize the data.

Aspects of the present disclosure support a customer data platform (e.g., implemented in cloud platform 115) that supports different data models for various tenants (e.g., cloud clients 105) of a multi-tenant system. Each tenant may use a data model that defines entities, attributes, and relationships between the entities and attributes and various attribute types. The customer data platform leverages the data model for a tenant to support declarative expression definition for segment identification. Thus, the user (e.g., a marketing manager of a cloud client 105) may access the customer data platform via a user device. For example, the user may access the customer data platform via a web browser or an application on the device. The user may perform various operations for generating a segment of the tenant's contacts 110, which may be examples of subscribers, customers, potential customers, etc. The user interface may display a list of selectable attributes, which the user may select to define an attribute. If the user selects a one-to-many attribute, as defined in the data model, then the system may activate a set of attributes that are related to the one-to-many attribute for use in combination with the one-to-many attributes for defining the expression. Thus, because the system leverages a data model, the system supports a user friendly process for defining an expression and also supports prevention of the user from defining invalid expressions. Further, these techniques support segment identification without modification of the underlying data (e.g., normalizing the target data), thus reducing processing and memory overhead associated with database modification and table combining.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example use of the system described herein, a marketing manager may want to define a segment called "Premium Shoe Fans." The user may select "Sales Order" product" as an initial attribute, and the system may generate a container in the user interface as well as an aggregation operator for sales orders. The user may select "count" (aggregation operators) and "at least" (qualifier) and "1" (value or input) such that the user has made at least one purchase. Within the container the user may select a "Product Description" attribute and "Model Year" attribute and define the expressions such that the product description contains "shoe" and the model year is 2019. The user may accept the expression, and the system may identify entities associated with users or entities that have purchased at least one shoe that is a 2019 model. This and other examples are further described with respect to the following figures.

Figure 2:
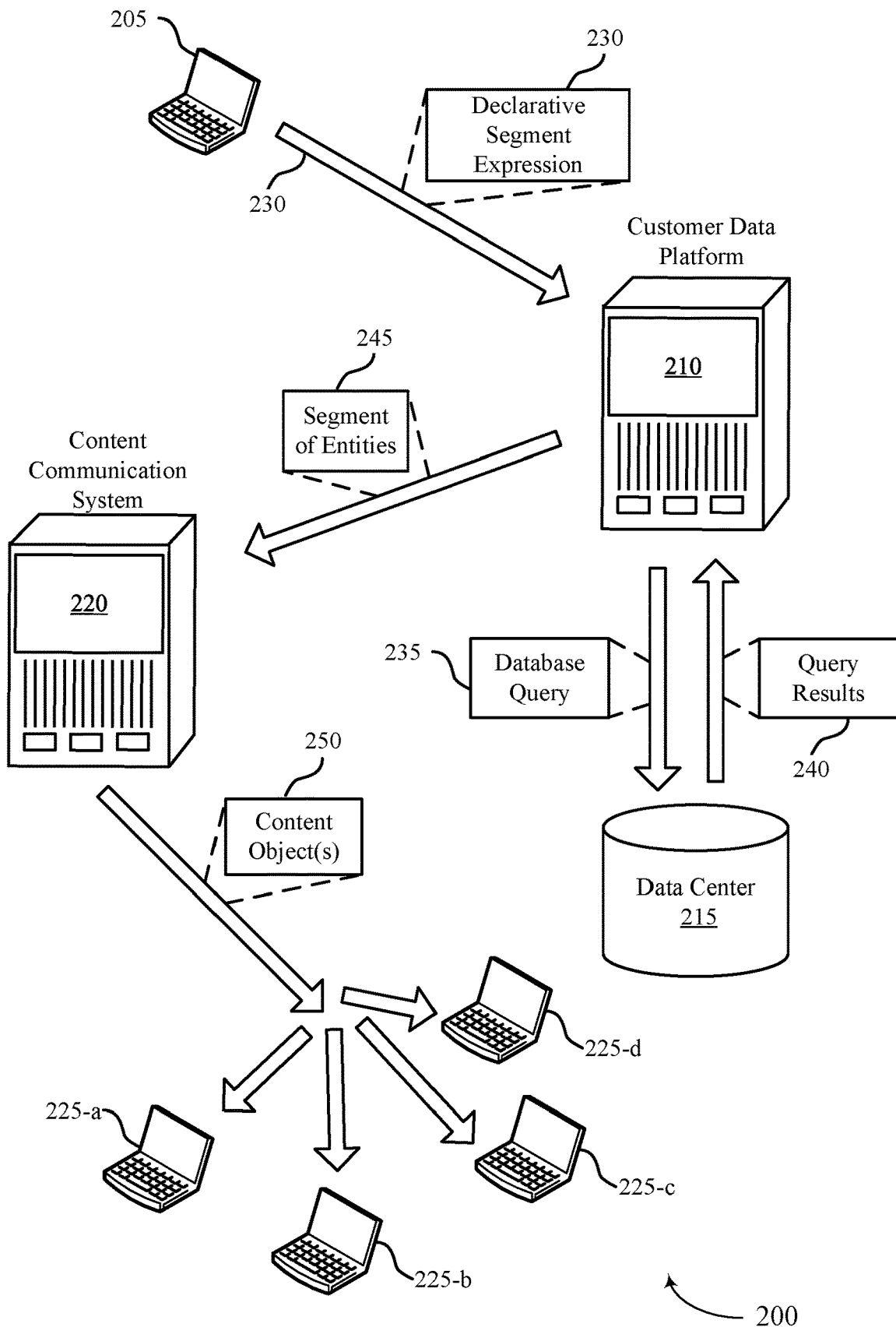
FIG. 2 illustrates an example of a system that supports declarative entity segmentation in accordance with aspects of the present disclosure.

FIG. 2 illustrates an example of a system 200 that supports declarative entity segmentation in accordance with aspects of the present disclosure. The system 200 includes a customer data platform 210 and a content communication system 220. The customer data platform 210 and/or the content communication system 220 may be implemented in various computing systems, such as one or more servers as described with respect to cloud platform 115 of FIG. 1. More particularly, the cloud platform 115 may include various computing systems that support various services, such as the customer data platform 210 and the content communication system 220. In some examples, the customer data platform 210 and the content communication system 220 may be implemented in the same physical and/or logical computing systems. In some cases, the content communication system 220 may be a service supported by the customer data platform 210 or some other similar platform or service.

The customer data platform 210 may support various services, including, and without limitation, an entity segmentation service. As described with respect to FIG. 1, the entity segmentation service may be configured to support a plurality of tenants (e.g., cloud clients 105). Each tenant may be configured with a respective data model that is stored in and managed by aspects of data center 215, which may be an example of a data center 120 of FIG. 1. Each data model may include a plurality of entities that are associated with respective entity identifiers. The entities may be associated with one or more users (e.g., a contact 110 of FIG. 1), which may be an example of customers, prospective customers, a team, a group of users, or the like. Each entity identifier may be associated with various attributes defined by the data model. The attributes may correspond to various characteristics, such as purchase history, web-behavior data, user characteristics (e.g., name, address, email address, age, gender, geographic location), among other attributes. The customer data platform 210 may monitor and augment the data model based on various user behaviors. For example, when a user purchases a product/service using a platform (e.g., an online store) supported by a tenant, data associated with the purchase may be augmented to the data model, and more particularly, to one or more entity identifiers associated with the user.

The data model may define various attributes that may be associated with entities, and the available attributes may be defined in association with entity type or entity class by the data model. In some examples, the entity is associated with a client (e.g., a client device, application, or the like) that the user utilizes to access various services. As such, each user may be associated with a plurality of entity identifiers. For example, a user may be associated with a respective individual entity identifier (corresponding to an individual entity class) for a mobile device or mobile device application and a desktop. In some cases, a user may be associated with an entity identifier for the user in a physical store. Further, the model for each tenant may define the respective relationships between entities. For example, each individual entity identifier (e.g., corresponding to the user in a store, using a mobile device, and using a desktop) may be associated with a unified entity (a unified individual entity class) with a respective identifier. Thus, this unified entity may be a "parent entity" or may have a parent relationship with each individual entity corresponding to the user for the respective clients or at a physical store. As such, each individual entity may be a "child entity" or have a child relationship with the unified entity. The customer data platform 210 may support a technique or service that identifies individual entities that correspond to the same user.

Other types of relationships may also be defined by the data model for a particular tenant. In some examples, the relationships between entity classes may be hierarchical relationships. For example, a set of individual entities or unified individual entities may be associated with a group entity (e.g., a group entity class). In one example, the group entity may be a household entity that corresponds to individuals of a household. In other example, a group entity may correspond to a team of individuals at an organization or firm. As such, the group entity may function as a parent entity of other entities. Similarly, group entities may also be associated with a parent entity. For example, an organizational or firm entity may be a parent entity of multiple group entities.

As discussed herein, the attributes that are available for the data model may vary for different tenants. Further, attributes may be associated with various sub-attributes or related attributes. For example, a purchase attribute may include sub-attributes that include the product name, price, date, and other product specifications. As described, the data model for the particular tenant may define these various types of relationships as well as the attributes. Further, the data model may maintain the relationships of various entities and the attributes that are associated with the entities. For example, database tables may maintain the entities, the attributes associated with the entities, sub-attributes, and other such information. Since some attributes may include sub attributes, a series of database tables may be configured for a data model. For example, a table may be configured for a purchase, and thus, multiple purchase tables may be associated with a particular entity, where each table includes information associated with a particular purchase. Other database configurations are contemplated within the scope of this disclosure.

The segmentation service supported by the customer data platform 210 may leverage the data model and the defined attributes and entity relationships for segment generation. In some cases, a marketing manager or another user (e.g., an employee of a tenant) may access the customer data platform for segment generation. A segment may be used for distribution of content (e.g., content objects). For example, the marketer may wish to identify a segment of the tenant subscribers or customers for marketing purposes. Rather, than sending content object to all subscribers or customers, the marketer may wish to define a segment of their subscribers for targeted marketing. For example, a user may utilize a user device 205, which may be an example of a device of a cloud client 105 or tenant, to access the segmentation service. The customer data platform 210 may support a user interface which the user may access to select an entity class, attributes, and the like for segment generation. For example, the user may select an entity class supported by the data model of the particular tenant. The selected entity class may be the basis for segment generation, meaning that the resultant segment may include entities of the selected entity class. After selection of the entity class, the segmentation service may display a set of selectable attributes for the selected entity class. The user may select one or more attributes, one or more operators, and other declarative components for generating a segment definition (e.g., a declarative segment expression 230). Based on the user selection of the attributes and other parameters, the customer data platform 210 may generate a database query 235 and execute the database query 235 on the database associated with the data model for the particular tenant. As described, the database may be managed by the data center 215, which may be integrated with or supported by the customer data platform 210.

In response to execution of the database query 235, a set of query results 240 may be surfaced. The query results 240 may correspond to a set of entity identifiers associated with entities that satisfy the declarative segment expression 230. For example, the declarative expression may correspond to "users that have spent more than $500 in the last year." In this example, the query results 240 may be list of entity identifiers (from the data model) that correspond to users that have spent more than $500 in the past year. Thus, this list of entity identifiers may be the identified segment of entities. It should be understood that many different types of attributes, values, and combinations of these may be used to define a segment.

After generating the segment of entities using the features supported by the customer data platform, the entities corresponding to the segment of entities 245 may be transmitted to or indicated to the content communication system 220. The content communication system 220 may support scheduling distribution, managing distribution, and the actual distribution of content objects 250 to user devices 225 that are associated with entities of the segment of entities 245. In some cases, a user may access the content communication system 220 for configuring a content object distribution schedule and frequency. The content communication system 220 may also monitor various feedback metrics associated with the distributed content object 250, such as click rate and open rate. These metrics may be further used to refine the content distribution schedule, among other features. The content communication system 220 may support distribution of the content object 250 using various channels, such as email, social media, search advertising, video advertising, mobile push, among other channels. Thus, the various identifiers or addresses for the various channels for users/entities may be maintained in association with the entities. In some cases, the distribution of content to the segment of entities may be referred to as segment activation.

Techniques described herein support generation of the declarative segment expression 230 by the user of the user device 205. As described herein, the user may select an entity class, such as individual, unified individual, or a group, such that the generated segment includes entities of the selected entity class. After selection of the entity class, the system may display attributes that may be associated with entities of the selected entity class as defined in the data model. The displayed and selectable attributes may be direct attributes or one-to-many attributes. Direct attributes are those attributes that may have one value or input per attribute. For example, one person may have one date of birth, one name, one eye color, etc., and as such, each of these attributes may be direct attributes or one-to-one attributes. If the user selects a direct attribute for the segment expression, then the system may activate a simple filter for the direct attribute. If, the user selects a one-to-many attribute, then the system may display a container, an aggregation operator selection component, among other features to define a complex filter using the attributes associated with the one-to-many attribute. Thus, the configuration of the data model and the selected attributes define how the user may build the expression, which may result in a streamlined segment building experience. Further, because the expression is limited by the data model and attribute type, the system may prevent invalid expressions, while also supporting complex segmentation without having to normalize or combine tables in the data model for the tenant.

Figure 3:
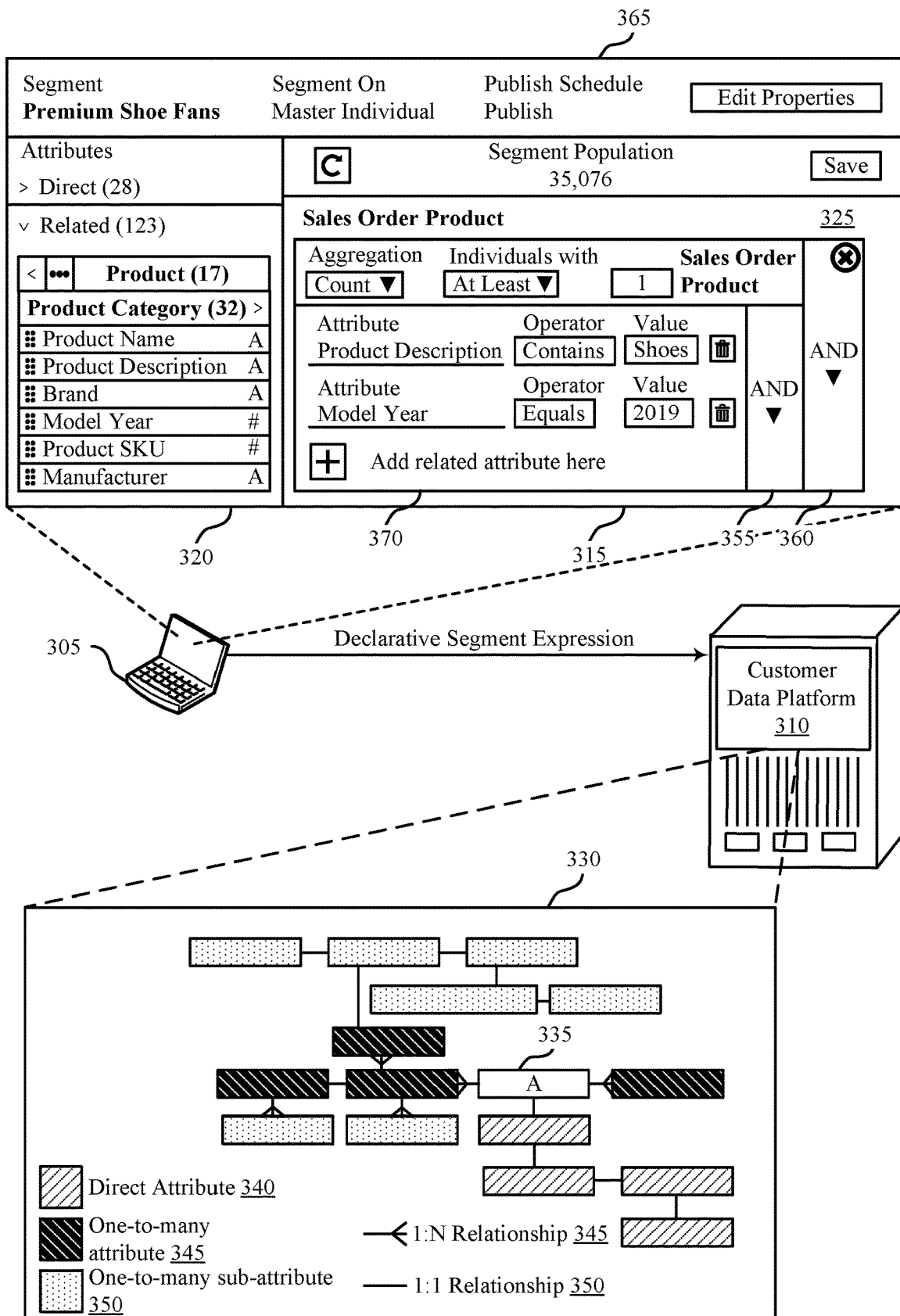
FIG. 3 illustrates an example of a declarative segmentation system that supports declarative entity segmentation in accordance with aspects of the present disclosure.

FIG. 3 illustrates an example of a declarative segmentation system 300 that supports declarative entity segmentation in accordance with aspects of the present disclosure. The system 300 includes a user device 305 and a customer data platform 310. The customer data platform 310 may be an example of the customer data platform 210 of FIG. 2. The customer data platform 310 may support various services for multiple tenants of a multi-tenant system. For example, the customer data platform 310 may support a segmentation service, as described with respect to FIG. 2. Further, the customer data platform 310 may maintain, manage, and augment data models for various tenants. Each data model includes entities and attributes associated with the entities. The data models may be augmented based on various customer or subscriber behavior using platforms and services supported by the tenants.

The customer data platform 310 may support a user interface 315 that may be used for various services, such as segmentation and activation, and the user interface 315 may be accessed via user device 305. The user interface 315 displays an attribute pane 320, which includes a listing of selectable attributes. The listing of selectable attributes may be surfaced based on the entity class for which the segment is to be generated as well as the data model. As illustrated in information pane 365, the segment is to be generated on master individual (e.g., unified individual) entities. As such, the attribute pane 320 includes attributes that may be associated with a master individual, according to the data model. The attribute pane 320 includes direct attributes and related attributes. The user may select, drag, and drop attributes from the attribute pane 320 to a canvas 325.

Data model portion 330 illustrates an example portion of a data model for a particular tenant. The data model portion 330 includes an entity 335 and illustrates attributes that are associated with the entity 335. The data model portion 330 is for illustrative purposes, and the data model may be represented in database tables. The entity 335 may be associated with various direct attributes 340 and one-to-many attributes, which may be one-to-many attributes 345 and one-to-many sub-attributes 350. A direct attribute 340 may have a 1:1 relationship with the entity 335 or with the entity via another attribute. In one example, a direct attribute may be person attribute, which may include values such as name, identifier, etc. and a passport attribute may be associated with the person attribute. The passport attribute may include multiple attributes, such as identifier, expiration data, etc. A one-to-many attribute 345 may include a purchase order, for example. There may be multiple purchase orders associated with the entity 335, and each purchase order attribute may have a set of one-to-many sub-attributes 350.

If the entity 335 is a master or unified individual entity, as illustrated as being selected for the segment in user interface 315, then the attribute pane may display attributes that may be associated with the entity 335 as illustrated in the data model portion 330. Thus, different entity classes may have different attributes displayed for selection based on the data model.

In user interface 315, the user has selected a product attribute, and more particularly, a sales order product attribute. Because the sales order product attribute is a one-to-many attribute 345 (e.g., there may be multiple instances of the attribute for an entity), the customer data platform 310 causes a user interface 315 to display representation of a container node 370. The user may use the container node 370 to aggregate an input for each instance of the attribute using an aggregation operator user interface component (e.g., a user interface component that currently displays "Count" in the user interface 315). When an input is aggregated, the system may identify whether an entity is associated the attributes that satisfy the aggregation operator and value. In the illustrated example, the aggregation is count, a qualifier (e.g., limiting or qualifying function) is "at least" and the value is 1. This portion of the expression may identify entities associated with at least one sales order product attribute. Other types of aggregations are supported, as described herein.

Within the representation of the container node 370, the user may further define the expression that may include one or more filters. However, the customer data platform 310 may activate attributes for selection (e.g., cause the attributes to be displayed for selection) based on the selected one-to-many attribute 345. The activated attributes may be those attributes which depend from the selected on-to-many attribute 345. Thus, within the representation of the container node 370 the user interface 315 may limit selection of those attributes that depend from the container node. Other attributes (e.g., direct attributes 340 and one-to-many attributes 345 and one-to-many sub-attributes 350) that do not depend from the selected one-to-many attribute 345 may not be selected for inclusion within the representation of the container node 370. This technique may support a user selecting or generating a valid expression. In some examples, to activate the selectable attributes, the customer data platform may query the data model to identify the attributes that depend from the selected attribute. Thus, upon selection of the one-to-many attribute, the data model may be queried, and the resultant sub-attributes surfaced to the user interface 315.

Within the representation of the container node 370, the user may select the dependent attributes, operators, and values for each selected attribute. Further, the user may use Boolean expressions to combine or define filters corresponding to multiple attributes within the representation of the container node 370, as illustrated with the Boolean "AND" operator of user interface component 355. Further, one or more attributes within the representation of the container node 370 may be combined with the aggregated one-to-many attribute 345, as illustrated with the Boolean "AND" operator in user interface component 360. The user may selectively modify various operators and values for their preferences. The user may use Boolean operators other than "AND," such as "OR" or "NOT." Further aggregation operators and qualifiers may be selected, such as at most, minimum, maximum, average, mean, median, mode, equal to, or the like. The aggregation operator may be combined with a qualifier or limiting term (e.g., at least, minimum, maximum, contains, a date limiting term, etc.) and a value for defining the aggregation function.

In some cases, multiple containers and/or simple filters may be combined using a higher layer Boolean expression. For example, the representation of the container node 370 may be combined using "AND" or "OR" with another representation of a container node corresponding to a one-to-many attribute 345 or to a simple filter corresponding to a selected direct attribute 340. Further, containers may be nested in some implementations. For example, within the representation of a container node 370, the user may select another one-to-many attribute, which may cause a nested container node to be displayed within the presentation of the container node 370. Attribute selections may be limited to those that depend from the selected one-to-many attribute, as described herein. As the user builds the expression, which includes the selected attributes, operators, and values, the system may refresh to identify a segment population count. In other cases, a user may refresh (e.g., by activating a refresh user interface component or button) to identify the segment population count. To identify the population count, the system may generate a database query based on the expression and execute the database query on the data to identify the entities of the data model that satisfy the expression. Thus, the expression functions as a filter for entities that do not satisfy the expression from the entity population of the data model.

Further, once the user is satisfied with the expression (and the corresponding population count), the user may confirm the expression. The customer data platform 310 may then execute the query against the data model to identify a list of entities that satisfy the expression. The list of entities may be the segment of entities. The entity identifiers corresponding to the segment of entities may be transmitted to a content communication system for content distribution, as described herein.

Figure 4A:
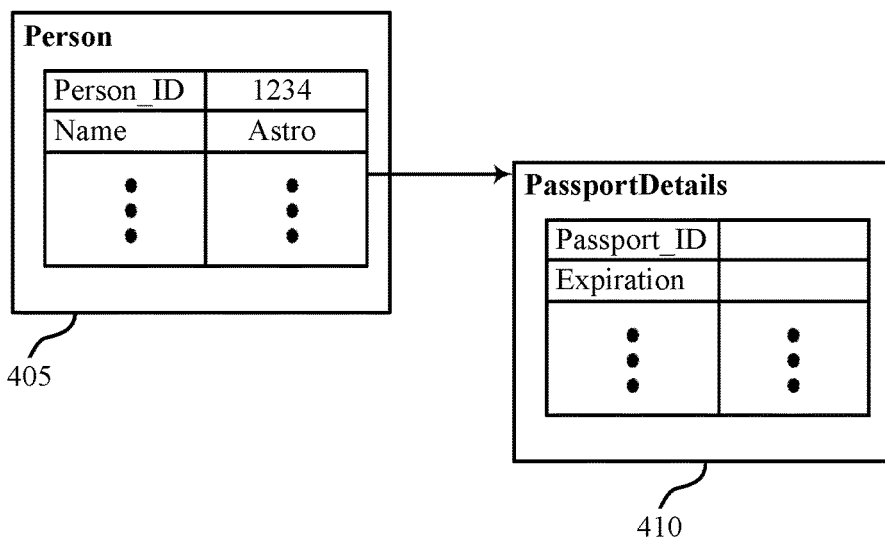
FIG. 4A and FIG. 4B illustrates examples of attribute representations that support declarative entity segmentation in accordance with aspects of the present disclosure.
Figure 4B:
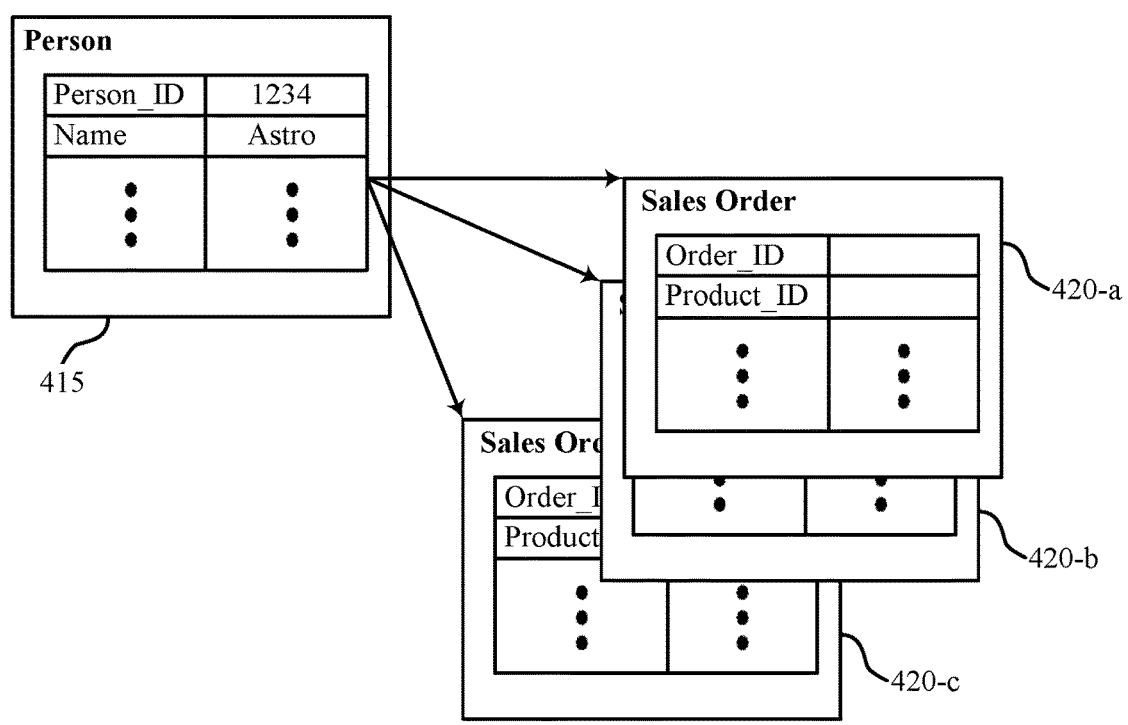

FIG. 4A and FIG. 4B illustrate examples of attribute representations 400 that support declarative entity segmentation in accordance with aspects of the present disclosure. The attribute representations 400 may be implemented by data models of various tenants of a multi-tenant system. For example, the attribute representations 400 may be accessed by the customer data platform 210 and 310 as described with respect to FIGS. 2 and 3 for supporting declarative entity segmentation.

Attribute representation 400-a of FIG. 4A illustrates an example of a record 405 for a person. The record is illustrated as an example database table. The record 405 includes various characteristics, which may correspond to attributes of the data model. A direct attribute record 410 is linked to the record 405. The direct attribute record 410 corresponds to a direct attribute, since there may be one instance of the attribute associated with the entity corresponding to the person record 405. In the illustrated example, the direct attribute record 410 corresponds to passport details of the user. The passport details attribute may include multiple sub-attributes and/or associated values, such as passport identifier, expiration date, etc.

Attribute representation 400-b of FIG. 4B illustrates an example of a record 415 of a person. The record is illustrated as an example database table. The record 410 includes various characteristics, which may correspond to attributes or values/inputs of the attributes of the data model. A set of one-to-many attribute records 420, "Sales Order" is associated with the person record 415. Since the sales order record is a one-to-many attribute, multiple instances of the record may be included in the data model (e.g., record 420-a, record 420-b, and record 420-c). Each instance of the record 420 may correspond to a different sales order and may include different values for the sub-attributes, such as order identifier, product identifier, product characteristics, product price, product description, etc.

As described herein, a segmentation service of a customer data platform may leverage a data model that implements direct and one-to-many attributes, such as represented by attribute representations 400-a and 400-b, to support active guidance of declarative entity segmentation. For example, if the user selects a direct attribute, such as passport details illustrated by record 410, then customer data platform may activate a simple filter user interface component at the user interface. The user may then select filter operations for the passport details attribute. A simple filter may include a simple expression including an operator and one or more values.

If the user selects a one-to-many attribute, such as the sales order attribute illustrated by records 420, then the customer data platform may activate a representation of a container node at the user interface. Within this container node, the user may aggregate values from the multiple sales order attribute records 420 and/or use the number of sales order records 420 for segmentation purposes. The user may also combine various sub-attributes of the selected one-to-many attribute within the container node, and as such, the customer data platform may activate the sub-attributes for selection within the container node. Each selected sub-attribute within the container node may function as a filter, and multiple filters can be combined. Further, the customer data platform may prevent the user from selecting other non-related or non-dependent attributes (e.g., not related to the selected one-to-many attribute) within the container node.

Aggregation may determine sum, minimum, maximum, etc. For example, if the user selects to aggregate (e.g., a count) a one-to-many attribute, then the customer data platform 310 may generate a database query that determines how many instances of the one-to-many attribute exist for each entity of the data model. In another example, the number of instances may be limited by a time indication. For example, an expression may be generated that specifies a number of times that an entity is to meet a criteria. For example, an expression may specify: "master individuals who have 3 orders after Dec. 22, 2020" or "master individuals with all orders after Dec. 22, 2020." Thus, depending on the expression the database query may check one or more of the instances or records of the one-to-many attribute for each entity or a set of entities of the data model until a criteria is satisfied. As described, the query may count the instances until the criteria is satisfied or the query may check and aggregate values for the records for the one-to-many attribute (e.g., aggregate order spends for an entity until a criteria is satisfied). Other aggregation types are contemplated within the scope of the present disclosure.

Figure 5:
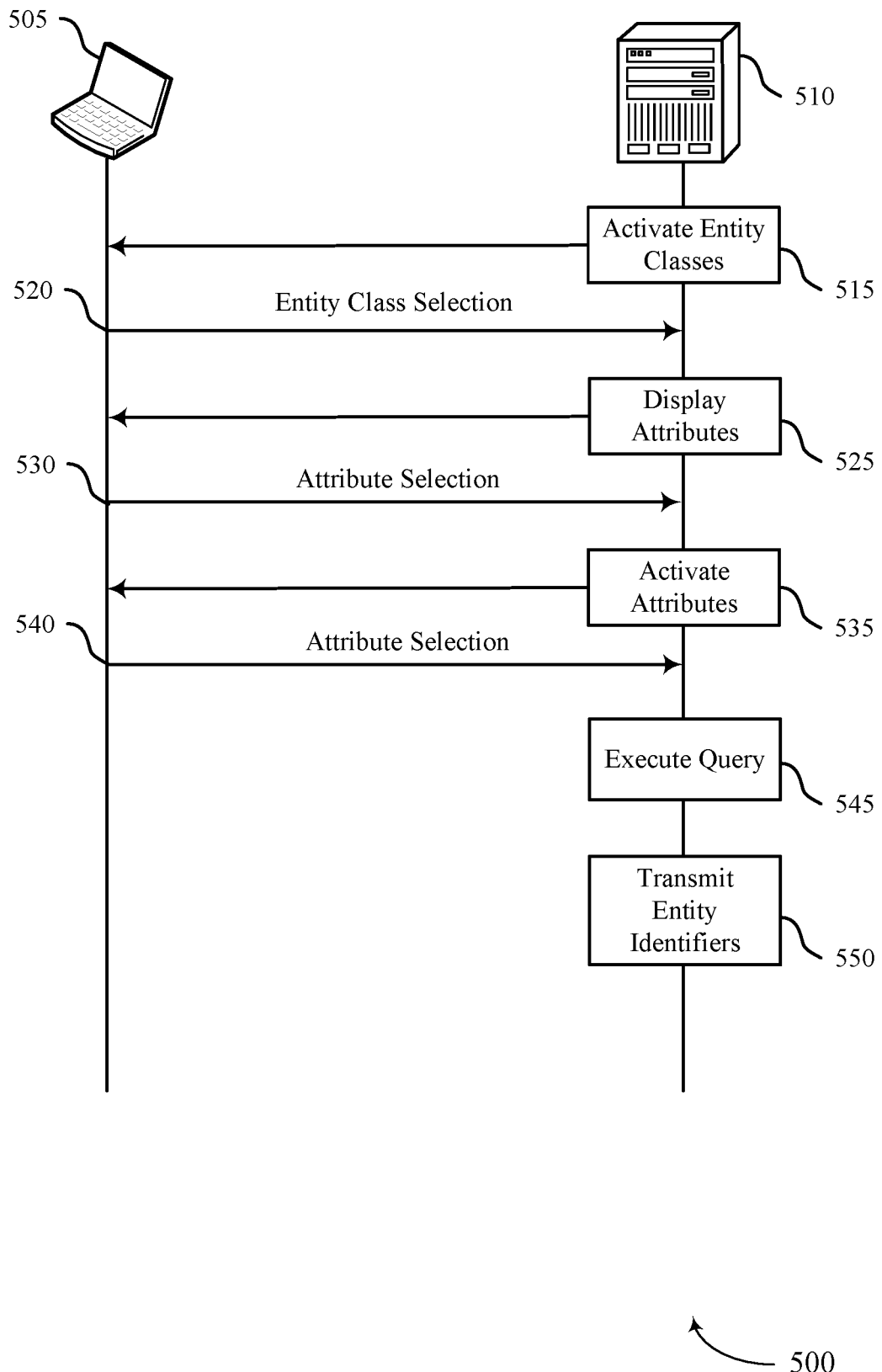
FIG. 5 illustrates an example of a process flow that supports declarative entity segmentation in accordance with aspects of the present disclosure.

FIG. 5 illustrates an example of a process flow 500 that supports declarative entity segmentation in accordance with aspects of the present disclosure. The process flow 500 may be implemented by a user device 505 and a server 510. The server 510 may be an example of or support a customer data platform 210 and 310 as described with respect to FIGS. 2 and 3. The user device 505 may be an example of a user device 205 and 305 as described with respect to FIGS. 2 and 3. A user may utilize user device 505 to access services, such as an entity segmentation service, as described herein.

The user, using user device 505, may access the entity segmentation service. The service may support a user interface displayed at the user device 505. The user may be an employee (e.g., marketing manager) at a tenant of a multi-tenant system supported by the server 510. The service may be accessed via a website or application at the user device 505. At 515, the server 510 may activate, for selection at the user interface, the plurality of entity classes based at least in part on a data model configured for the tenant. For example, the entity classes that the data model supports may be activated for selection. Activation may include causing the entity classes to be displayed at user device 505 for selection. Thus, activation may include transmitting an hypertext transfer protocol (HTTP) response to the user device 505 in response to a browser of the device navigating to the service. At 520, the server 510 may receive, via the user interface in response to activating the plurality of entity classes, a selection of the first entity class from the plurality of entity classes.

At 525, the server 510 may display, at a user interface, a plurality of attributes that are defined by a data model configured for a tenant of a multi-tenant system. The plurality of attributes may include a one-to-many attribute that is configured to support multiple inputs per attribute and a direct attribute configured to support a single input per attribute The attributes may be activated based on the entity class selection and the data model. For example, the data model may support various attributes for different entity classes. Thus, those attributes that may be associated with the entity class that is selected may be activated for selection.

At 530, the server 510, may receive via the user interface, a selection of a first attribute for defining an expression for identifying a segment of entities of an entity dataset defined by the data model. The first attribute may be classified as an example of the one-to-many attribute according to the data model. That is, the selected first attribute may be capable of including multiple values or inputs according to the data model for the tenant.

At 535, the server 510 may activate for selection at the user interface to further define the expression, a subset of the plurality of attributes. The subset may be activated based at least in part on each attribute of the subset being dependent on the first attribute in accordance with the data model. That is, each activated attribute may be a one-to-many sub-attribute as described with respect to FIG. 3. Further, activation of the subset of attributes may include causing the subset of attributes to be selectable to be combined with the selected first attribute for defining the expression. In some examples, activation may include activation of a container node such that the user interface limits selection to the dependent attributes (e.g., the subset of the plurality of attributes) within the container node. Further, activation may include activation of a user interface component for selecting an aggregator operator, qualifier (e.g., at least, min, max, sum, contains, a time domain limitation), and a value.

At 540, the server 510, may receive, based at least in part on activating the subset, a selection of a second attribute of the subset of the plurality of attributes. The second attribute may be used in combination with the first attribute to define the expression for identifying the segment of entities.

At 545, the server 510 may execute a database query, that is based at least in part on the indication of the expression, to identify the segment of entities.

At 550, the server 510 may transmit, to a content communication system, an indication of the segment of entities. In some examples, the server 510 may transmit an indication of entity identifiers corresponding to the segment of entities.

Figure 6:
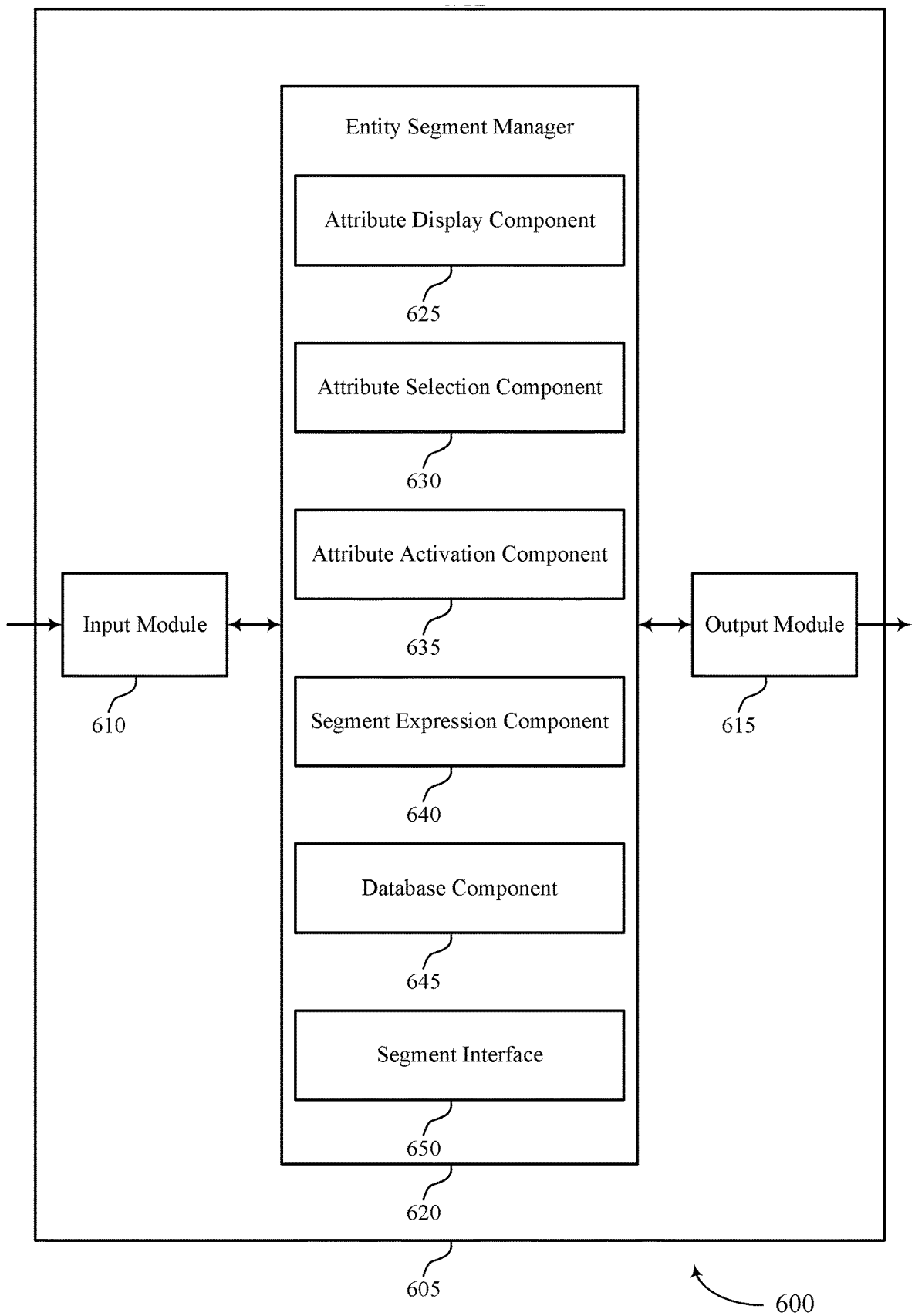
FIG. 6 shows a block diagram of an apparatus that supports declarative entity segmentation in accordance with aspects of the present disclosure.

FIG. 6 shows a block diagram 600 of a device 605 (e.g., apparatus) that supports declarative entity segmentation in accordance with aspects of the present disclosure. The device 605 may include an input module 610, an output module 615, and an entity segment manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the entity segment manager 620 to support declarative entity segmentation. In some cases, the input module 610 may be a component of an I/O controller 810 as described with reference to FIG. 8.

The output module 615 may manage output signals for the device 605. For example, the output module 615 may receive signals from other components of the device 605, such as the entity segment manager 620, and may transmit these signals to other components or devices. In some specific examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the entity segment manager 620 may include an attribute display component 625, an attribute selection component 630, an attribute activation component 635, a segment expression component 640, a database component 645, a segment interface 650, or any combination thereof. In some examples, the entity segment manager 620, or various components thereof, may be configured to perform various operations (e.g., receiving, monitoring, transmitting) using or otherwise in cooperation with the input module 610, the output module 615, or both. For example, the entity segment manager 620 may receive information from the input module 610, send information to the output module 615, or be integrated in combination with the input module 610, the output module 615, or both to receive information, transmit information, or perform various other operations as described herein.

The entity segment manager 620 may support data processing in accordance with examples as disclosed herein. The attribute display component 625 may be configured as or otherwise support a means for displaying, at a user interface, a plurality of attributes that are defined by a data model configured for a tenant of a multi-tenant system, the plurality of attributes including a one-to-many attribute that is configured to support multiple inputs per attribute and a direct attribute configured to support a single input per attribute. The attribute selection component 630 may be configured as or otherwise support a means for receiving, via the user interface, a selection of a first attribute for defining an expression for identifying a segment of entities of an entity dataset defined by the data model, the first attribute being classified as the one-to-many attribute. The attribute activation component 635 may be configured as or otherwise support a means for activating, for selection at the user interface to further define the expression, a subset of the plurality of attributes, the subset being activated based at least in part on each attribute of the subset being dependent on the first attribute in accordance with the data model. The segment expression component 640 may be configured as or otherwise support a means for receiving, based at least in part on activating the subset, an indication of the expression. The database component 645 may be configured as or otherwise support a means for executing a database query, that is based at least in part on the indication of the expression, to identify the segment of entities. The segment interface 650 may be configured as or otherwise support a means for transmitting, to a content communication system, an indication of the segment of entities.

Figure 7:
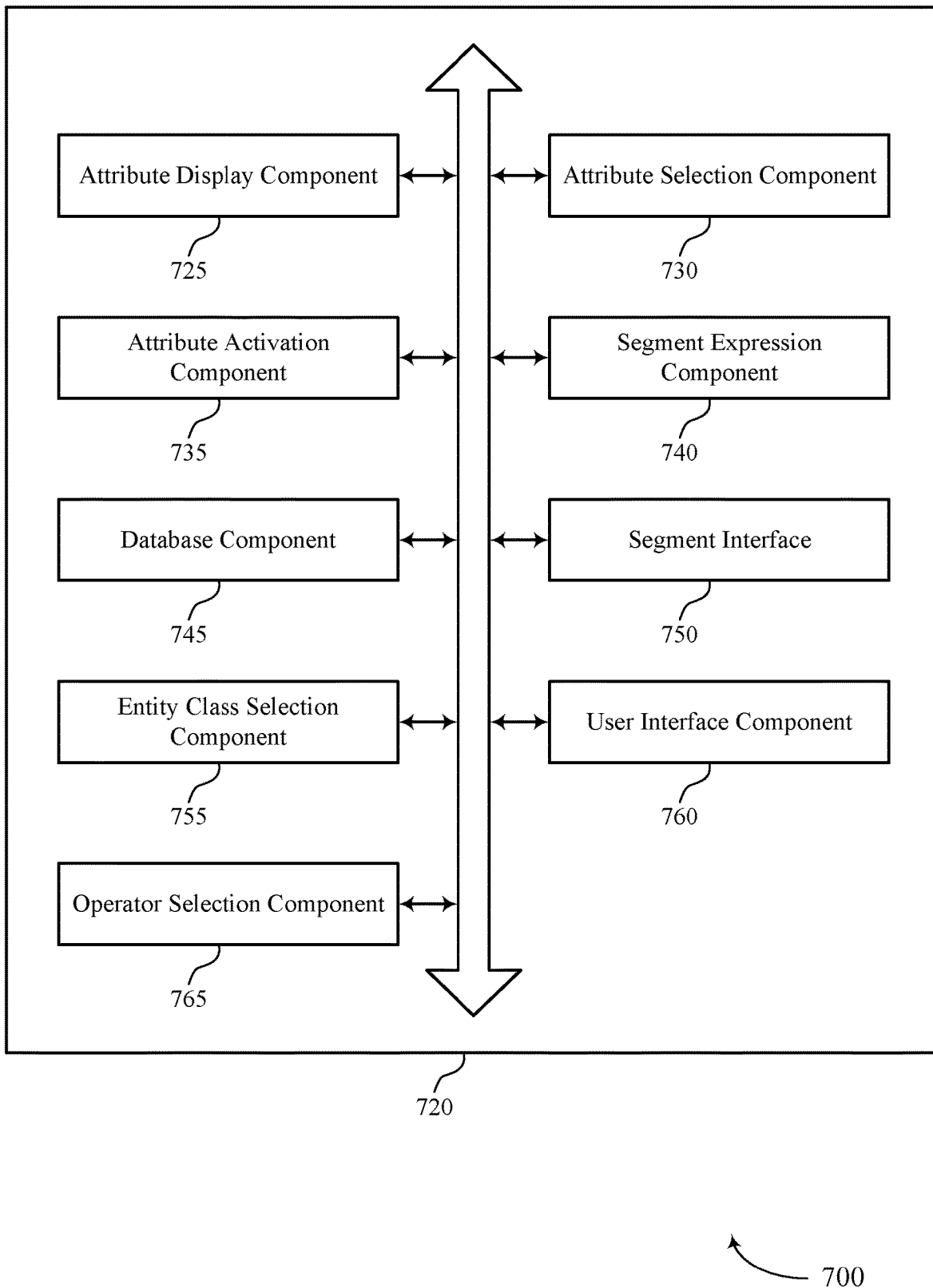
FIG. 7 shows a block diagram of an entity segment manager that supports declarative entity segmentation in accordance with aspects of the present disclosure.

FIG. 7 shows a block diagram 700 of an entity segment manager 720 that supports declarative entity segmentation in accordance with aspects of the present disclosure. The entity segment manager 720 may be an example of aspects of an entity segment manager or an entity segment manager 620, or both, as described herein. The entity segment manager 720, or various components thereof, may be an example of means for performing various aspects of declarative entity segmentation as described herein. For example, the entity segment manager 720 may include an attribute display component 725, an attribute selection component 730, an attribute activation component 735, a segment expression component 740, a database component 745, a segment interface 750, an entity class selection component 755, a user interface component 760, an operator selection component 765, or any combination thereof. Each of these components may communicate, directly or indirectly, with one another (e.g., via one or more buses).

The entity segment manager 720 may support data processing in accordance with examples as disclosed herein. The attribute display component 725 may be configured as or otherwise support a means for displaying, at a user interface, a plurality of attributes that are defined by a data model configured for a tenant of a multi-tenant system, the plurality of attributes including a one-to-many attribute that is configured to support multiple inputs per attribute and a direct attribute configured to support a single input per attribute. The attribute selection component 730 may be configured as or otherwise support a means for receiving, via the user interface, a selection of a first attribute for defining an expression for identifying a segment of entities of an entity dataset defined by the data model, the first attribute being classified as the one-to-many attribute. The attribute activation component 735 may be configured as or otherwise support a means for activating, for selection at the user interface to further define the expression, a subset of the plurality of attributes, the subset being activated based at least in part on each attribute of the subset being dependent on the first attribute in accordance with the data model. The segment expression component 740 may be configured as or otherwise support a means for receiving, based at least in part on activating the subset, an indication of the expression. The database component 745 may be configured as or otherwise support a means for executing a database query, that is based at least in part on the indication of the expression, to identify the segment of entities. The segment interface 750 may be configured as or otherwise support a means for transmitting, to a content communication system, an indication of the segment of entities.

In some examples, the entity class selection component 755 may be configured as or otherwise support a means for receiving, at the user interface, a selection of an entity class to be used for a basis for identifying the segment of entities, wherein the plurality of attributes are displayed based at least in part on the plurality of attributes being associated with the selected entity class according to the data model.

In some examples, the attribute selection component 730 may be configured as or otherwise support a means for receiving, based at least in part on activating the subset, a selection of a second attribute of the subset of the plurality of attributes, wherein the second attribute is used in combination with the first attribute to define the expression for identifying the segment of entities.

In some examples, the user interface component 760 may be configured as or otherwise support a means for activating, at the user interface in response to the selected first attribute being classified as the one-to-many attribute, a representation of a container node, wherein the user interface is configured to limit selection of one or more attributes of the subset within the container node.

In some examples, the container node includes a user interface component that is configured to define an operator for defining the expression in combination with the first attribute and one or more attributes of the subset.

In some examples, the user interface component 760 may be configured as or otherwise support a means for activating, at the user interface in response to the selected first attribute being classified as the one-to-many attribute, a first user interface component that is configured to define an aggregation operator and a second user interface component that is configured to define a value, the aggregation operator and the value used in combination with the first attribute for defining the expression.

In some examples, the operator selection component 765 may be configured as or otherwise support a means for receiving, via the user interface, a selection of the aggregation operator via the first user interface component and a selection of the value via the second user interface component, wherein the database query is executed based at least in part on the first attribute, the aggregation operator, and the value.

In some examples, the aggregation operator and the value are used to filter entities of a plurality of entities supported by the data model that do not satisfy the expression based at least in part on attributes of the plurality of attributes that are associated with the plurality of entities in accordance with the data model.

In some examples, to support receiving the indication of the expression, the user interface component 760 may be configured as or otherwise support a means for receiving an indication of the first attribute, one or more additional attributes, one or more Boolean operators, one or more aggregation operators, or a combination thereof.

In some examples, the first attribute corresponds to a product, a purchase history, a store, an organization, user web behavior data, or a combination thereof.

Figure 8:
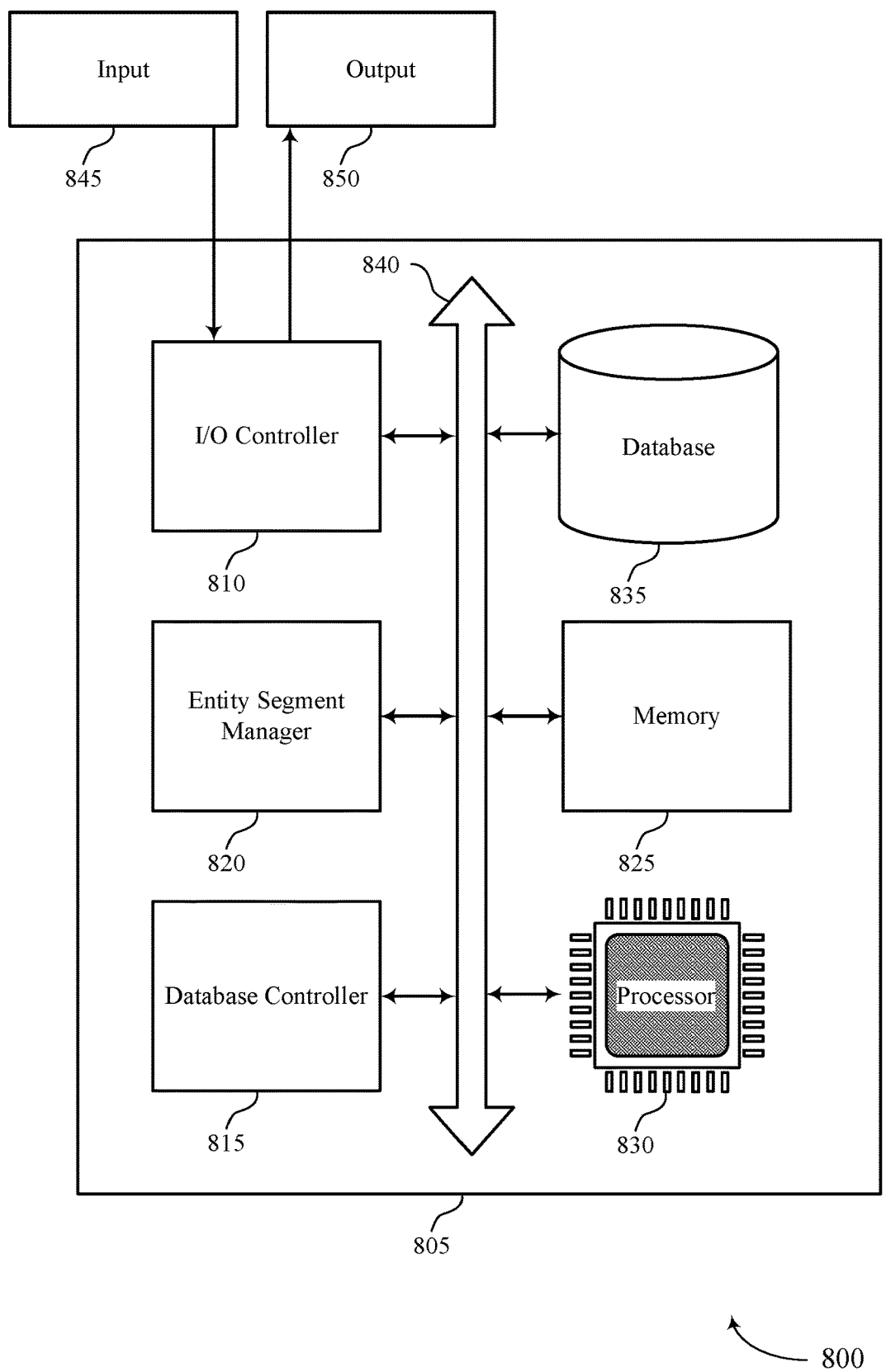
FIG. 8 shows a diagram of a system including a device that supports declarative entity segmentation in accordance with aspects of the present disclosure.

FIG. 8 shows a diagram of a system 800 including a device 805 (e.g., apparatus) that supports declarative entity segmentation in accordance with aspects of the present disclosure. The device 805 may be an example of or include the components of a device 605 as described herein. The device 805 may include components for bi-directional voice and data communications including components for transmitting and receiving communications, such as an entity segment manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor. In some cases, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a digital signal processor (DSP), a CPU, a microcontroller, an ASIC, an field programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting declarative entity segmentation).

The entity segment manager 820 may support data processing in accordance with examples as disclosed herein. For example, the entity segment manager 820 may be configured as or otherwise support a means for displaying, at a user interface, a plurality of attributes that being defined by a data model configured for a tenant of a multi-tenant system, the plurality of attributes including a one-to-many attribute that is configured to support multiple inputs per attribute and a direct attribute configured to support a single input per attribute. The entity segment manager 820 may be configured as or otherwise support a means for receiving, via the user interface, a selection of a first attribute for defining an expression for identifying a segment of entities of an entity dataset defined by the data model, the first attribute being classified as the one-to-many attribute. The entity segment manager 820 may be configured as or otherwise support a means for activating, for selection at the user interface to further defining the expression, a subset of the plurality of attributes, the subset being activated based at least in part on each attribute of the subset being dependent on the first attribute in accordance with the data model. The entity segment manager 820 may be configured as or otherwise support a means for receiving, based at least in part on activating the subset, an indication of the expression. The entity segment manager 820 may be configured as or otherwise support a means for executing a database query, that is based at least in part on the indication of the expression, to identify the segment of entities. The entity segment manager 820 may be configured as or otherwise support a means for transmitting, to a content communication system, an indication of the segment of entities.

By including or configuring the entity segment manager 820 in accordance with examples as described herein, the device 805 may support techniques for efficient declarative segment identification. The device 805 may leverage a data model for a particular tenant to limit attribute selection for a defining an expression. Using these techniques, these system may identify a valid expression and also a complex expression for segment identification.

Figure 9:
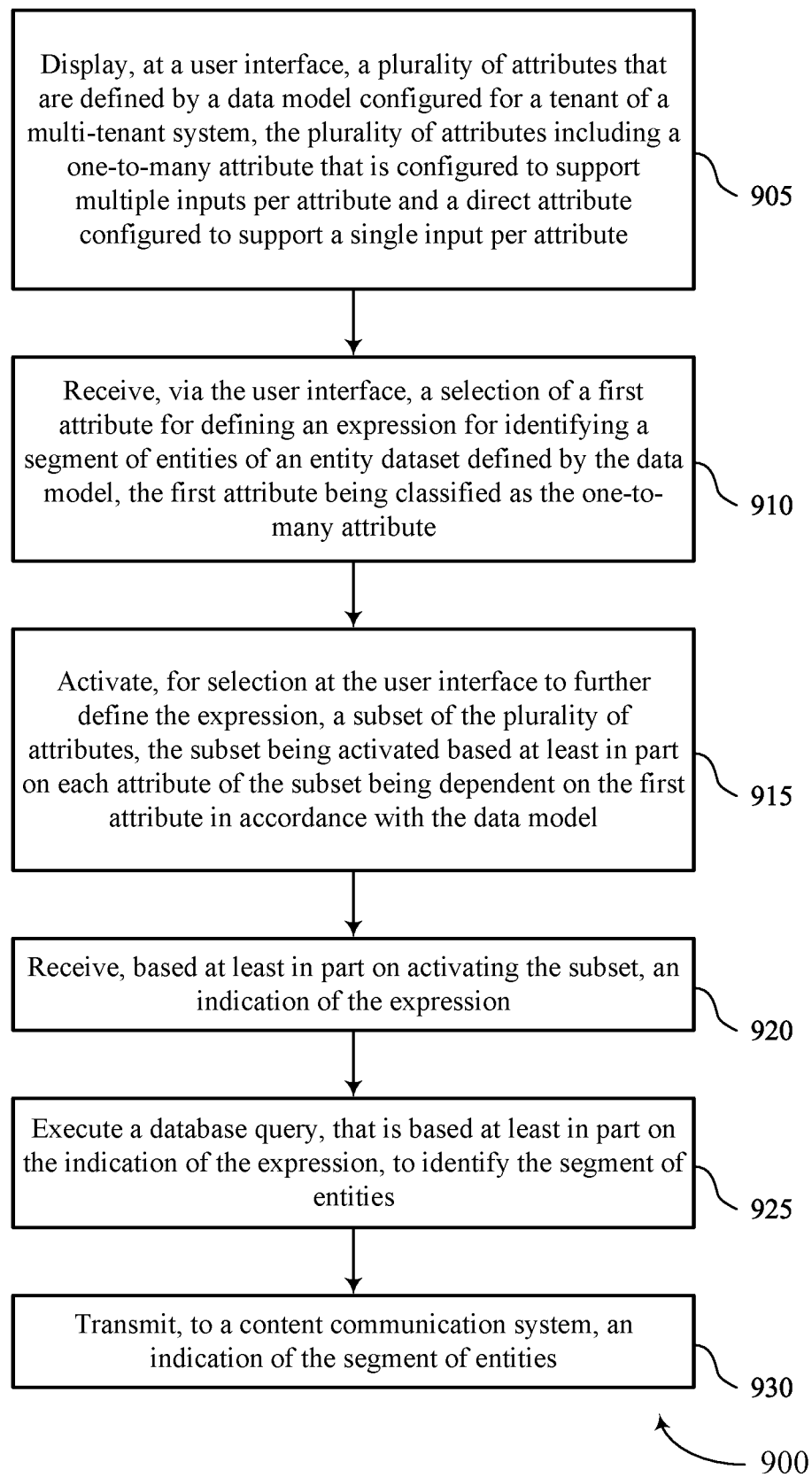
FIGS. 9 through 12 show flowcharts illustrating methods that support declarative entity segmentation in accordance with aspects of the present disclosure.

FIG. 9 shows a flowchart illustrating a method 900 that supports declarative entity segmentation in accordance with aspects of the present disclosure. The operations of the method 900 may be implemented by a server or device or its components as described herein. For example, the operations of the method 900 may be performed by a server as described with reference to FIG. 1 through 8. In some examples, a server may execute a set of instructions to control the functional elements of the server to perform the described functions. Additionally or alternatively, the server may perform aspects of the described functions using special-purpose hardware.

At 905, the method may include displaying, at a user interface, a plurality of attributes that are defined by a data model configured for a tenant of a multi-tenant system, the plurality of attributes including a one-to-many attribute that is configured to support multiple inputs per attribute and a direct attribute configured to support a single input per attribute. The operations of 905 may be performed in accordance with examples as disclosed herein. In some examples, aspects of the operations of 905 may be performed by an attribute display component 725 as described with reference to FIG. 7.

At 910, the method may include receiving, via the user interface, a selection of a first attribute for defining an expression for identifying a segment of entities of an entity dataset defined by the data model, the first attribute being classified as the one-to-many attribute. The operations of 910 may be performed in accordance with examples as disclosed herein. In some examples, aspects of the operations of 910 may be performed by an attribute selection component 730 as described with reference to FIG. 7.

At 915, the method may include activating, for selection at the user interface to further define the expression, a subset of the plurality of attributes, the subset being activated based at least in part on each attribute of the subset being dependent on the first attribute in accordance with the data model. The operations of 915 may be performed in accordance with examples as disclosed herein. In some examples, aspects of the operations of 915 may be performed by an attribute activation component 735 as described with reference to FIG. 7.

At 920, the method may include receiving, based at least in part on activating the subset, an indication of the expression. The operations of 920 may be performed in accordance with examples as disclosed herein. In some examples, aspects of the operations of 920 may be performed by a segment expression component 740 as described with reference to FIG. 7.

At 925, the method may include executing a database query, that is based at least in part on the indication of the expression, to identify the segment of entities. The operations of 925 may be performed in accordance with examples as disclosed herein. In some examples, aspects of the operations of 925 may be performed by a database component 745 as described with reference to FIG. 7.

At 930, the method may include transmitting, to a content communication system, an indication of the segment of entities. The operations of 930 may be performed in accordance with examples as disclosed herein. In some examples, aspects of the operations of 930 may be performed by a segment interface 750 as described with reference to FIG. 7.

Figure 10:
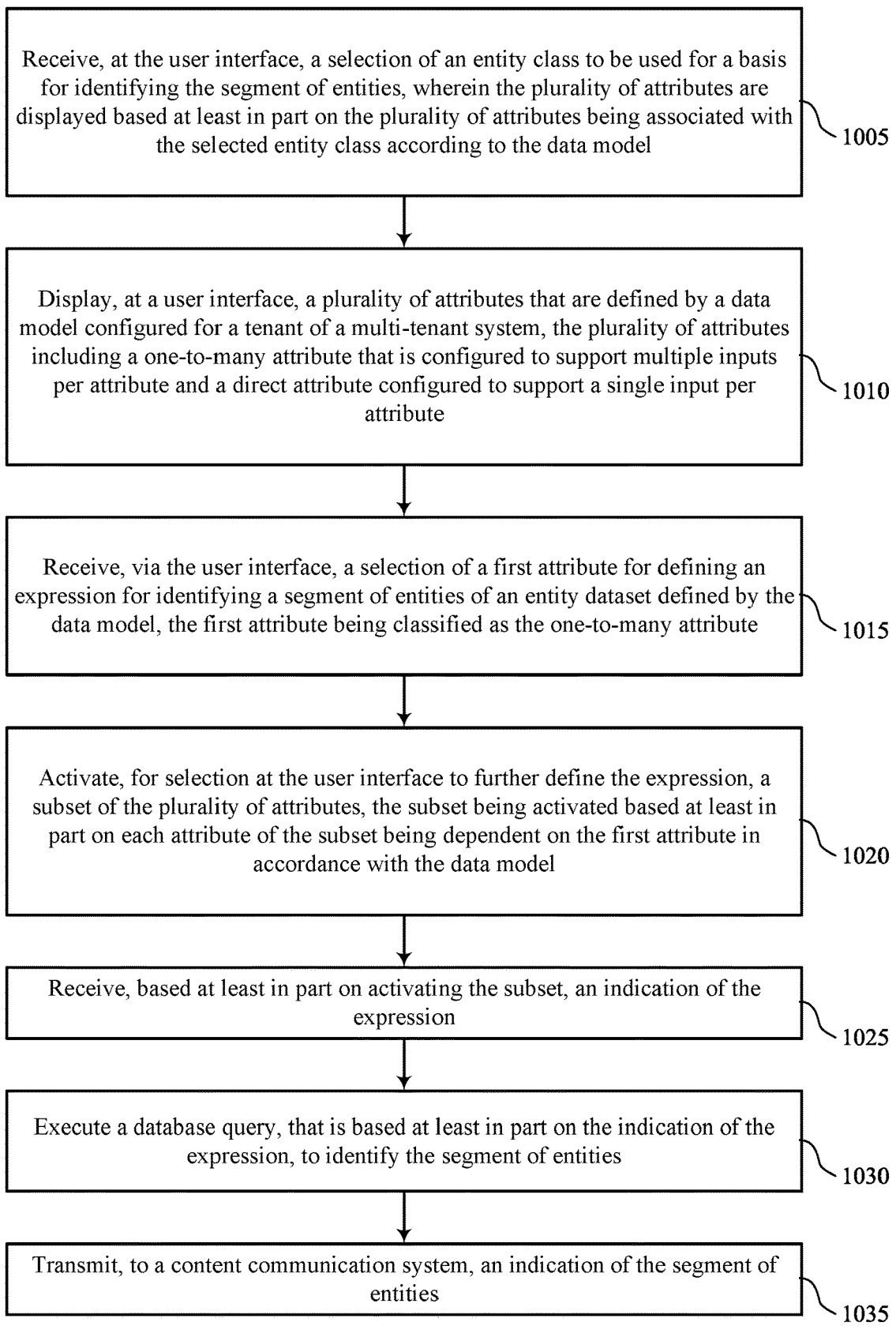

FIG. 10 shows a flowchart illustrating a method 1000 that supports declarative entity segmentation in accordance with aspects of the present disclosure. The operations of the method 1000 may be implemented by a server or device or its components as described herein. For example, the operations of the method 1000 may be performed by a server as described with reference to FIG. 1 through 8. In some examples, a server may execute a set of instructions to control the functional elements of the server to perform the described functions. Additionally or alternatively, the server may perform aspects of the described functions using special-purpose hardware.

At 1005, the method may include receiving, at the user interface, a selection of an entity class to be used for a basis for identifying the segment of entities, wherein the plurality of attributes are displayed based at least in part on the plurality of attributes being associated with the selected entity class according to the data model. The operations of 1005 may be performed in accordance with examples as disclosed herein. In some examples, aspects of the operations of 1005 may be performed by an entity class selection component 755 as described with reference to FIG. 7.

At 1010, the method may include displaying, at a user interface, a plurality of attributes that are defined by a data model configured for a tenant of a multi-tenant system, the plurality of attributes including a one-to-many attribute that is configured to support multiple inputs per attribute and a direct attribute configured to support a single input per attribute. The operations of 1010 may be performed in accordance with examples as disclosed herein. In some examples, aspects of the operations of 1010 may be performed by an attribute display component 725 as described with reference to FIG. 7.

At 1015, the method may include receiving, via the user interface, a selection of a first attribute for defining an expression for identifying a segment of entities of an entity dataset defined by the data model, the first attribute being classified as the one-to-many attribute. The operations of 1015 may be performed in accordance with examples as disclosed herein. In some examples, aspects of the operations of 1015 may be performed by an attribute selection component 730 as described with reference to FIG. 7.

At 1020, the method may include activating, for selection at the user interface to further define the expression, a subset of the plurality of attributes, the subset being activated based at least in part on each attribute of the subset being dependent on the first attribute in accordance with the data model. The operations of 1020 may be performed in accordance with examples as disclosed herein. In some examples, aspects of the operations of 1020 may be performed by an attribute activation component 735 as described with reference to FIG. 7.

At 1025, the method may include receiving, based at least in part on activating the subset, an indication of the expression. The operations of 1025 may be performed in accordance with examples as disclosed herein. In some examples, aspects of the operations of 1025 may be performed by a segment expression component 740 as described with reference to FIG. 7.

At 1030, the method may include executing a database query, that is based at least in part on the indication of the expression, to identify the segment of entities. The operations of 1030 may be performed in accordance with examples as disclosed herein. In some examples, aspects of the operations of 1030 may be performed by a database component 745 as described with reference to FIG. 7.

At 1035, the method may include transmitting, to a content communication system, an indication of the segment of entities. The operations of 1035 may be performed in accordance with examples as disclosed herein. In some examples, aspects of the operations of 1035 may be performed by a segment interface 750 as described with reference to FIG. 7.

Figure 11:
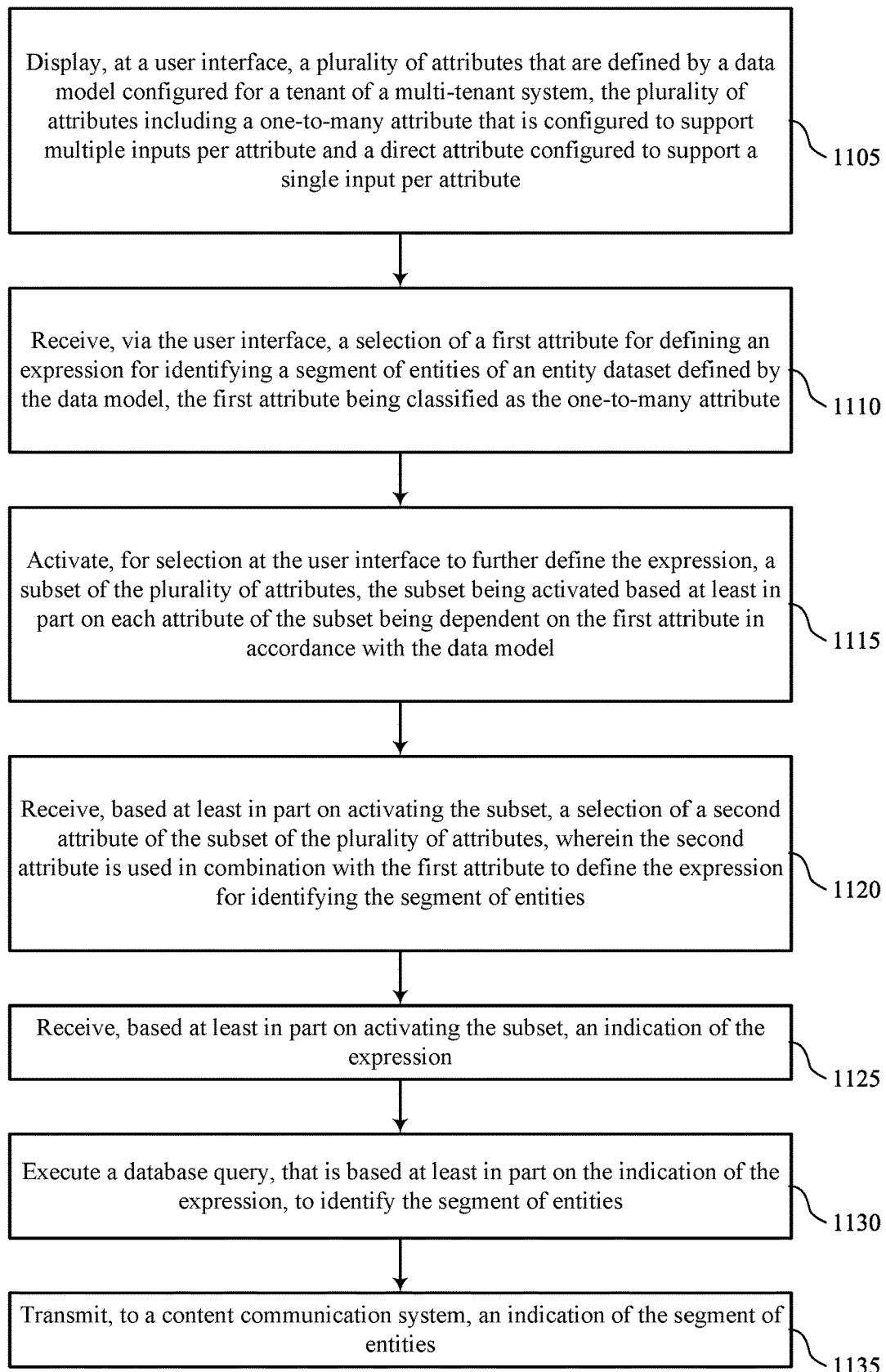

FIG. 11 shows a flowchart illustrating a method 1100 that supports declarative entity segmentation in accordance with aspects of the present disclosure. The operations of the method 1100 may be implemented by a server or device or its components as described herein. For example, the operations of the method 1100 may be performed by a server as described with reference to FIG. 1 through 8. In some examples, a server may execute a set of instructions to control the functional elements of the server to perform the described functions. Additionally or alternatively, the server may perform aspects of the described functions using special-purpose hardware.

At 1105, the method may include displaying, at a user interface, a plurality of attributes that are defined by a data model configured for a tenant of a multi-tenant system, the plurality of attributes including a one-to-many attribute that is configured to support multiple inputs per attribute and a direct attribute configured to support a single input per attribute. The operations of 1105 may be performed in accordance with examples as disclosed herein. In some examples, aspects of the operations of 1105 may be performed by an attribute display component 725 as described with reference to FIG. 7.

At 1110, the method may include receiving, via the user interface, a selection of a first attribute for defining an expression for identifying a segment of entities of an entity dataset defined by the data model, the first attribute being classified as the one-to-many attribute. The operations of 1110 may be performed in accordance with examples as disclosed herein. In some examples, aspects of the operations of 1110 may be performed by an attribute selection component 730 as described with reference to FIG. 7.

At 1115, the method may include activating, for selection at the user interface to further define the expression, a subset of the plurality of attributes, the subset being activated based at least in part on each attribute of the subset being dependent on the first attribute in accordance with the data model. The operations of 1115 may be performed in accordance with examples as disclosed herein. In some examples, aspects of the operations of 1115 may be performed by an attribute activation component 735 as described with reference to FIG. 7.

At 1120, the method may include receiving, based at least in part on activating the subset, a selection of a second attribute of the subset of the plurality of attributes, wherein the second attribute is used in combination with the first attribute to define the expression for identifying the segment of entities. The operations of 1120 may be performed in accordance with examples as disclosed herein. In some examples, aspects of the operations of 1120 may be performed by an attribute selection component 730 as described with reference to FIG. 7.

At 1125, the method may include receiving, based at least in part on activating the subset, an indication of the expression. The operations of 1125 may be performed in accordance with examples as disclosed herein. In some examples, aspects of the operations of 1125 may be performed by a segment expression component 740 as described with reference to FIG. 7.

At 1130, the method may include executing a database query, that is based at least in part on the indication of the expression, to identify the segment of entities. The operations of 1130 may be performed in accordance with examples as disclosed herein. In some examples, aspects of the operations of 1130 may be performed by a database component 745 as described with reference to FIG. 7.

At 1135, the method may include transmitting, to a content communication system, an indication of the segment of entities. The operations of 1135 may be performed in accordance with examples as disclosed herein. In some examples, aspects of the operations of 1135 may be performed by a segment interface 750 as described with reference to FIG. 7.

Figure 12:
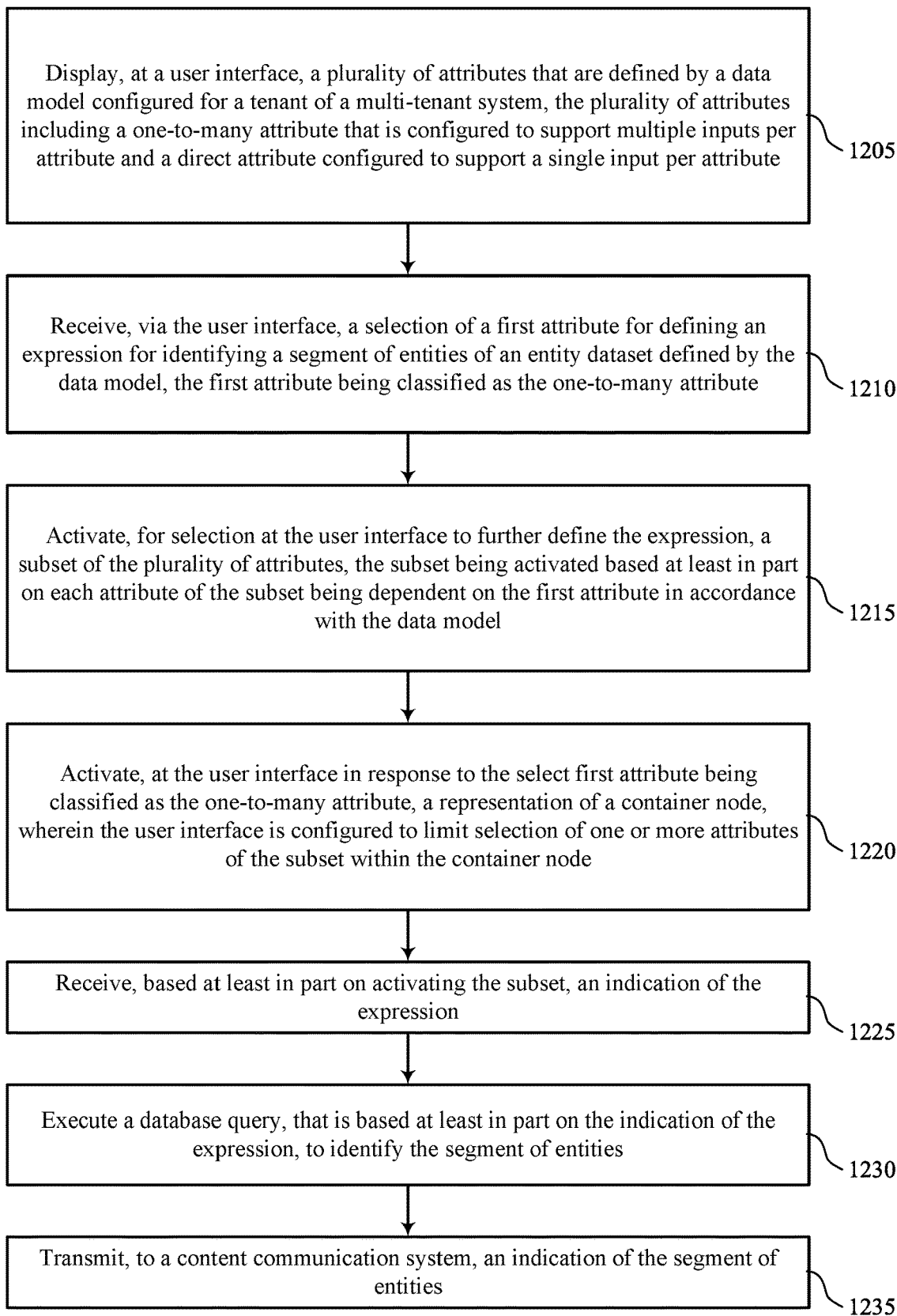

FIG. 12 shows a flowchart illustrating a method 1200 that supports declarative entity segmentation in accordance with aspects of the present disclosure. The operations of the method 1200 may be implemented by a server or device or its components as described herein. For example, the operations of the method 1200 may be performed by a server as described with reference to FIG. 1 through 8. In some examples, a server may execute a set of instructions to control the functional elements of the server to perform the described functions. Additionally or alternatively, the server may perform aspects of the described functions using special-purpose hardware.

At 1205, the method may include displaying, at a user interface, a plurality of attributes that are defined by a data model configured for a tenant of a multi-tenant system, the plurality of attributes including a one-to-many attribute that is configured to support multiple inputs per attribute and a direct attribute configured to support a single input per attribute. The operations of 1205 may be performed in accordance with examples as disclosed herein. In some examples, aspects of the operations of 1205 may be performed by an attribute display component 725 as described with reference to FIG. 7.

At 1210, the method may include receiving, via the user interface, a selection of a first attribute for defining an expression for identifying a segment of entities of an entity dataset defined by the data model, the first attribute being classified as the one-to-many attribute. The operations of 1210 may be performed in accordance with examples as disclosed herein. In some examples, aspects of the operations of 1210 may be performed by an attribute selection component 730 as described with reference to FIG. 7.

At 1215, the method may include activating, for selection at the user interface to further define the expression, a subset of the plurality of attributes, the subset being activated based at least in part on each attribute of the subset being dependent on the first attribute in accordance with the data model. The operations of 1215 may be performed in accordance with examples as disclosed herein. In some examples, aspects of the operations of 1215 may be performed by an attribute activation component 735 as described with reference to FIG. 7.

At 1220, the method may include activating, at the user interface in response to the selected first attribute being classified as the one-to-many attribute, a representation of a container node, wherein the user interface is configured to limit selection of one or more attributes of the subset within the container node. The operations of 1220 may be performed in accordance with examples as disclosed herein. In some examples, aspects of the operations of 1220 may be performed by a user interface component 760 as described with reference to FIG. 7.

At 1225, the method may include receiving, based at least in part on activating the subset, an indication of the expression. The operations of 1225 may be performed in accordance with examples as disclosed herein. In some examples, aspects of the operations of 1225 may be performed by a segment expression component 740 as described with reference to FIG. 7.

At 1230, the method may include executing a database query, that is based at least in part on the indication of the expression, to identify the segment of entities. The operations of 1230 may be performed in accordance with examples as disclosed herein. In some examples, aspects of the operations of 1230 may be performed by a database component 745 as described with reference to FIG. 7.

At 1235, the method may include transmitting, to a content communication system, an indication of the segment of entities. The operations of 1235 may be performed in accordance with examples as disclosed herein. In some examples, aspects of the operations of 1235 may be performed by a segment interface 750 as described with reference to FIG. 7.

A method for data processing is described. The method may include displaying, at a user interface, a plurality of attributes that are defined by a data model configured for a tenant of a multi-tenant system, the plurality of attributes including a one-to-many attribute that is configured to support multiple inputs per attribute and a direct attribute configured to support a single input per attribute, receiving, via the user interface, a selection of a first attribute for defining an expression for identifying a segment of entities of an entity dataset defined by the data model, the first attribute being classified as the one-to-many attribute, activating, for selection at the user interface to further define the expression, a subset of the plurality of attributes, the subset being activated based at least in part on each attribute of the subset being dependent on the first attribute in accordance with the data model, receiving, based at least in part on activating the subset, an indication of the expression, executing a database query, that is based at least in part on the indication of the expression, to identify the segment of entities, and transmitting, to a content communication system, an indication of the segment of entities.

An apparatus for data processing is described. The apparatus may include a processor, memory in electronic communication with the processor, and instructions stored in the memory. The instructions may be executable by the processor to cause the apparatus to display, at a user interface, a plurality of attributes that be defined by a data model configured for a tenant of a multi-tenant system, the plurality of attributes including a one-to-many attribute that is configured to support multiple inputs per attribute and a direct attribute configured to support a single input per attribute, receive, via the user interface, a selection of a first attribute for defining an expression for identifying a segment of entities of an entity dataset defined by the data model, the first attribute being classified as the one-to-many attribute, activate, for selection at the user interface to further define the expression, a subset of the plurality of attributes, the subset being activated based at least in part on each attribute of the subset being dependent on the first attribute in accordance with the data model, receive, based at least in part on activating the subset, an indication of the expression, execute a database query, that is based at least in part on the indication of the expression, to identify the segment of entities, and transmit, to a content communication system, an indication of the segment of entities.

Another apparatus for data processing is described. The apparatus may include means for displaying, at a user interface, a plurality of attributes that are defined by a data model configured for a tenant of a multi-tenant system, the plurality of attributes including a one-to-many attribute that is configured to support multiple inputs per attribute and a direct attribute configured to support a single input per attribute, means for receiving, via the user interface, a selection of a first attribute for defining an expression for identifying a segment of entities of an entity dataset defined by the data model, the first attribute being classified as the one-to-many attribute, means for activating, for selection at the user interface to further define the expression, a subset of the plurality of attributes, the subset being activated based at least in part on each attribute of the subset being dependent on the first attribute in accordance with the data model, means for receiving, based at least in part on activating the subset, an indication of the expression, means for executing a database query, that is based at least in part on the indication of the expression, to identify the segment of entities, and means for transmitting, to a content communication system, an indication of the segment of entities.

A non-transitory computer-readable medium storing code for data processing is described. The code may include instructions executable by a processor to display, at a user interface, a plurality of attributes that be defined by a data model configured for a tenant of a multi-tenant system, the plurality of attributes including a one-to-many attribute that is configured to support multiple inputs per attribute and a direct attribute configured to support a single input per attribute, receive, via the user interface, a selection of a first attribute for defining an expression for identifying a segment of entities of an entity dataset defined by the data model, the first attribute being classified as the one-to-many attribute, activate, for selection at the user interface to further define the expression, a subset of the plurality of attributes, the subset being activated based at least in part on each attribute of the subset being dependent on the first attribute in accordance with the data model, receive, based at least in part on activating the subset, an indication of the expression, execute a database query, that is based at least in part on the indication of the expression, to identify the segment of entities, and transmit, to a content communication system, an indication of the segment of entities.

Some examples of the method, apparatuses, and non-transitory computer-readable medium described herein may further include operations, features, means, or instructions for receiving, at the user interface, a selection of an entity class to be used for a basis for identifying the segment of entities, wherein the plurality of attributes may be displayed based at least in part on the plurality of attributes being associated with the selected entity class according to the data model.

Some examples of the method, apparatuses, and non-transitory computer-readable medium described herein may further include operations, features, means, or instructions for receiving, based at least in part on activating the subset, a selection of a second attribute of the subset of the plurality of attributes, wherein the second attribute may be used in combination with the first attribute to define the expression for identifying the segment of entities.

In some examples of the method, apparatuses, and non-transitory computer-readable medium described herein, activating, at the user interface in response to the selected first attribute being classified as the one-to-many attribute, a representation of a container node, wherein the user interface may be configured to limit selection of one or more attributes of the subset within the container node.

In some examples of the method, apparatuses, and non-transitory computer-readable medium described herein, the container node includes a user interface component that may be configured to define an operator for defining the expression in combination with the first attribute and one or more attributes of the subset.

In some examples of the method, apparatuses, and non-transitory computer-readable medium described herein, activating, at the user interface in response to the selected first attribute being classified as the one-to-many attribute, a first user interface component that may be configured to define an aggregation operator and a second user interface component that may be configured to define a value, the aggregation operator and the value used in combination with the first attribute for defining the expression.

Some examples of the method, apparatuses, and non-transitory computer-readable medium described herein may further include operations, features, means, or instructions for receiving, via the user interface, a selection of the aggregation operator via the first user interface component and a selection of the value via the second user interface component, wherein the database query may be executed based at least in part on the first attribute, the aggregation operator, and the value.

In some examples of the method, apparatuses, and non-transitory computer-readable medium described herein, the aggregation operator and the value may be used to filter entities of a plurality of entities supported by the data model that do not satisfy the expression based at least in part on attributes of the plurality of attributes that may be associated with the plurality of entities in accordance with the data model.

In some examples of the method, apparatuses, and non-transitory computer-readable medium described herein, receiving the indication of the expression may include operations, features, means, or instructions for receiving an indication of the first attribute, one or more additional attributes, one or more Boolean operators, one or more aggregation operators, or a combination thereof.

In some examples of the method, apparatuses, and non-transitory computer-readable medium described herein, the first attribute corresponds to a product, a purchase history, a store, an organization, user web behavior data, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   displaying, at a user interface, a first set of attributes of a plurality of attributes that are defined by a data model configured for a tenant of a multi-tenant system, the data model defining one or more entity and attribute relationships, the plurality of attributes including a one-to-many attribute that is configured to support multiple inputs per attribute and a direct attribute configured to support a single input per attribute;
   activating, based at least in part on selection of a first attribute of the first set of attributes, a second set of attributes of the plurality of attributes, the second set of attributes being activated based at least in part on each attribute of the second set of attributes being dependent on the first attribute in accordance with the data model;
   receiving, via the user interface and based at least in part on activating the second set of attributes, an indication of an expression configured to identify a segment of entities of the data model;
   executing a database query, that is based at least in part on the indication of the expression, to identify the segment of entities; and
   transmitting, to a content communication system, an indication of the segment of entities.

2. The method of claim 1, further comprising:
   receiving, at the user interface, a selection of an entity class to be used for a basis for identifying the segment of entities, wherein the first set of attributes are displayed based at least in part on the plurality of attributes being associated with the selected entity class according to the data model.

3. The method of claim 1, further comprising:
   receiving, based at least in part on activating the second set of attributes, a selection of a second attribute of the second set of attributes, wherein the second attribute is used in combination with the first attribute to define the expression for identifying the segment of entities.

4. The method of claim 1, further comprising:
   activating, at the user interface, a representation of a container node, wherein the user interface is configured to limit selection of one or more attributes of the second set of attributes within the container node.

5. The method of claim 1, wherein the user interface includes a user interface component that is configured to receive a selection of an operator for defining the expression in combination with the first attribute and one or more attributes of the second set of attributes.

6. The method of claim 1, wherein the content communication system is configured for marketing to users associated with the segment of entities.

7. The method of claim 1, further comprising:
   receiving, via the user interface, an input comprising a value associated with the first attribute, wherein the expression is defined based at least in part on first attribute and the value.

8. The method of claim 1, wherein each entities of the segment of entities is an example of a contact, a customer, a lead, or a combination thereof.

9. The method of claim 1, wherein receiving the indication of the expression comprises:

receiving an indication of the first attribute, one or more additional attributes, one or more Boolean operators, one or more aggregation operators, or a combination thereof.

10. The method of claim 1, wherein the first attribute corresponds to an email address or a geographic location.

11. An apparatus for data processing, comprising:
a processor;
memory coupled with the processor; and
instructions stored in the memory and executable by the processor to cause the apparatus to:
  display, at a user interface, a first set of attributes of a plurality of attributes that are defined by a data model configured for a tenant of a multi-tenant system, the data model defining one or more entity and attribute relationships, the plurality of attributes including a one-to-many attribute that is configured to support multiple inputs per attribute and a direct attribute configured to support a single input per attribute;
  activate, based at least in part on selection of a first attribute of the first set of attributes, a second set of attributes of the plurality of attributes, the second set of attributes being activated based at least in part on each attribute of the second set of attributes being dependent on the first attribute in accordance with the data model;
  receive, via the user interface and based at least in part on activating the second set of attributes, an indication of an expression configured to identify a segment of entities of the data model;
  execute a database query, that is based at least in part on the indication of the expression, to identify the segment of entities; and
  transmit, to a content communication system, an indication of the segment of entities.

12. The apparatus of claim 11, wherein the instructions are further executable by the processor to cause the apparatus to:
  receive, at the user interface, a selection of an entity class to be used for a basis for identifying the segment of entities, wherein the first set of attributes are displayed based at least in part on the plurality of attributes being associated with the selected entity class according to the data model.

13. The apparatus of claim 11, wherein the instructions are further executable by the processor to cause the apparatus to:
  receive, based at least in part on activating the second set of attributes, a selection of a second attribute of the second set of attributes, wherein the second attribute is used in combination with the first attribute to define the expression for identifying the segment of entities.

14. The apparatus of claim 11, wherein the instructions are further executable by the processor to cause the apparatus to:
  activate, at the user interface, a representation of a container node, wherein the user interface is configured to limit selection of one or more attributes of the second set of attributes within the container node.

15. The apparatus of claim 11, wherein the user interface includes a user interface component that is configured to receive a selection of an operator for defining the expression in combination with the first attribute and one or more attributes of the second set of attributes.

16. A non-transitory computer-readable medium storing code for data processing, the code comprising instructions executable by a processor to:
  display, at a user interface, a first set of attributes of a plurality of attributes that are defined by a data model configured for a tenant of a multi-tenant system, the data model defining one or more entity and attribute relationships, the plurality of attributes including a one-to-many attribute that is configured to support multiple inputs per attribute and a direct attribute configured to support a single input per attribute;
  activate, based at least in part on selection of a first attribute of the first set of attributes, a second set of attributes of the plurality of attributes, the second set of attributes being activated based at least in part on each attribute of the second set of attributes being dependent on the first attribute in accordance with the data model;
  receive, via the user interface and based at least in part on activating the second set of attributes, an indication of an expression configured to identify a segment of entities of the data model;
  execute a database query, that is based at least in part on the indication of the expression, to identify the segment of entities; and
  transmit, to a content communication system, an indication of the segment of entities.

17. The non-transitory computer-readable medium of claim 16, wherein the instructions are further executable by the processor to:
  receive, at the user interface, a selection of an entity class to be used for a basis for identifying the segment of entities, wherein the first set of attributes are displayed based at least in part on the plurality of attributes being associated with the selected entity class according to the data model.

18. The non-transitory computer-readable medium of claim 16, wherein the instructions are further executable by the processor to:
  receive, based at least in part on activating the second set of attributes, a selection of a second attribute of the second set of attributes, wherein the second attribute is used in combination with the first attribute to define the expression for identifying the segment of entities.

19. The non-transitory computer-readable medium of claim 16, wherein the instructions are further executable by the processor to:
  activate, at the user interface, a representation of a container node, wherein the user interface is configured to limit selection of one or more attributes of the second set of attributes within the container node.

20. The non-transitory computer-readable medium of claim 16, wherein the user interface includes a user interface component that is configured to receive a selection of an operator for defining the expression in combination with the first attribute and one or more attributes of the second set of attributes.

* * * * *